US012009647B2

(12) United States Patent
Michael et al.

(10) Patent No.: US 12,009,647 B2
(45) Date of Patent: Jun. 11, 2024

(54) SOLAR CABLE RETENTION CLIPS AND SYSTEMS FOR STRUCTURE MOUNTING

(71) Applicant: SHOALS TECHNOLOGIES GROUP, LLC, Portland, TN (US)

(72) Inventors: Dorothy Michael, Portland, TN (US); Steve Ferguson, Portland, TN (US); Joaquin Pereda, Portland, TN (US); Dean Solon, Portland, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 0 days.

(21) Appl. No.: 17/735,806

(22) Filed: May 3, 2022

(65) Prior Publication Data

US 2022/0356963 A1    Nov. 10, 2022

Related U.S. Application Data

(60) Provisional application No. 63/262,848, filed on Oct. 21, 2021, provisional application No. 63/201,587, filed on May 5, 2021.

(51) Int. Cl.
*H02G 3/32* (2006.01)
*F16L 3/10* (2006.01)
(Continued)

(52) U.S. Cl.
CPC .......... *H02G 3/0456* (2013.01); *F16L 3/1033* (2013.01); *F16L 3/127* (2013.01);
(Continued)

(58) Field of Classification Search
None
See application file for complete search history.

(56) References Cited

U.S. PATENT DOCUMENTS

| 1,982,501 A | 11/1934 | Douglas |
| D188,323 S | 7/1960 | Johnson |

(Continued)

FOREIGN PATENT DOCUMENTS

| CN | 102339870 A | 4/2012 |
| GB | 2464680 A | 4/2010 |
| WO | 2018032033 A1 | 2/2018 |

OTHER PUBLICATIONS

International Search Report and Written Opinion for International Application No. PCT/US22/27483 dated Aug. 16, 2022.
(Continued)

*Primary Examiner* — Steven M Marsh
(74) *Attorney, Agent, or Firm* — MASCHOFF BRENNAN

(57) ABSTRACT

A cable retention clip can include a structure retention section and a cable retention section. The structure retention section can have a clamp body having a base wall and two side walls forming a planar slot therebetween. There can be at least one grip element in the slot that is coupled with at least one of the two side walls. The cable retention section can be coupled to the structure retention section. The cable retention section can include a clip body defining at least two cable retention channels. Each cable retention channel can have a cable opening (e.g., slot into lumen) that extends the length of the respective cable retention channel to form a C-shape. Each cable retention channel can be parallel with each other cable retention channel. In some aspects, the clip body defines at least a pair of the cable retention channels forming a ω shape.

26 Claims, 22 Drawing Sheets

(51) Int. Cl.
   *F16L 3/127*     (2006.01)
   *H01B 7/00*      (2006.01)
   *H02G 3/04*      (2006.01)
   *H02S 30/10*     (2014.01)
   *H02S 40/30*     (2014.01)

(52) U.S. Cl.
   CPC ............ *H01B 7/0045* (2013.01); *H02G 3/32* (2013.01); *H02S 30/10* (2014.12); *H02S 40/30* (2014.12)

(56) References Cited

U.S. PATENT DOCUMENTS

| | | | |
|---|---|---|---|
| 3,053,930 | A | 9/1962 | Mallanik et al. |
| 3,136,515 | A | 6/1964 | Potruch |
| 3,233,851 | A | 2/1966 | Lemieux |
| 3,353,567 | A | 11/1967 | Isreeli |
| 3,564,668 | A | 2/1971 | Kirk |
| 3,601,756 | A | 8/1971 | Stroh |
| D269,851 | S | 7/1983 | Kimura |
| 4,669,156 | A * | 6/1987 | Guido ............... F16L 3/2235 24/336 |
| D296,074 | S | 6/1988 | Seyfarth |
| D297,813 | S | 9/1988 | Marx |
| D331,698 | S | 12/1992 | Pezzoli |
| D332,401 | S | 1/1993 | Araujo, Jr |
| 5,331,725 | A | 7/1994 | Chou |
| D363,211 | S | 10/1995 | Noble |
| D375,890 | S | 11/1996 | Takai |
| D376,309 | S | 12/1996 | Takai |
| 5,613,655 | A | 3/1997 | Marion |
| 5,615,852 | A | 4/1997 | Heidorn et al. |
| D379,060 | S | 5/1997 | Laga |
| D387,652 | S | 12/1997 | Carlson, Jr. |
| D406,383 | S | 3/1999 | Adams |
| 6,227,502 | B1 | 5/2001 | Derman |
| 6,405,414 | B1 | 6/2002 | Byrnes |
| 6,477,744 | B1 * | 11/2002 | Miles ............... B43K 23/002 24/3.12 |
| D482,269 | S | 11/2003 | Martello |
| 6,802,480 | B1 | 10/2004 | Martello |
| D503,926 | S | 4/2005 | Marrs |
| D510,015 | S | 9/2005 | Hostetler |
| 7,162,836 | B2 | 1/2007 | Van Straaten |
| D568,254 | S | 5/2008 | Patchett |
| D581,255 | S | 11/2008 | Calvin |
| D584,132 | S | 1/2009 | Judd |
| D637,473 | S | 5/2011 | Mitchell |
| D640,527 | S | 6/2011 | Hoek |
| D646,556 | S | 10/2011 | Kelleghan |
| D657,869 | S | 4/2012 | Mammen |
| D660,690 | S | 5/2012 | Mixides |
| D704,594 | S | 5/2014 | Cherin |
| D728,349 | S | 5/2015 | Lake |
| D729,619 | S | 5/2015 | Cherin |
| D731,296 | S | 6/2015 | Nelson |
| D732,422 | S | 6/2015 | Fildan |
| D733,534 | S | 7/2015 | Altrichter |
| D753,260 | S | 4/2016 | Solovov, Jr. |
| D755,043 | S | 5/2016 | Bailey |
| D784,798 | S | 4/2017 | Logsdon |
| D791,558 | S | 7/2017 | Carpio |
| D803,164 | S | 11/2017 | Noble |
| D803,165 | S | 11/2017 | Noble |
| 9,903,511 | B2 | 2/2018 | Vermillion |
| D811,690 | S | 3/2018 | Berte |
| D815,982 | S | 4/2018 | Chang |
| D818,391 | S | 5/2018 | Chang |
| D818,392 | S | 5/2018 | Chang |
| D824,800 | S | 8/2018 | Blume |
| D840,795 | S | 2/2019 | Tribbett |
| D845,168 | S | 4/2019 | Paik |
| D848,899 | S | 5/2019 | Chang |
| 10,433,926 | B2 | 10/2019 | Recanati |
| D899,237 | S | 10/2020 | Peck |
| D906,790 | S | 1/2021 | Ng |
| D928,311 | S | 8/2021 | McVaney |
| D932,007 | S | 9/2021 | Moudy |
| D942,256 | S | 2/2022 | Christiansen |
| 11,236,858 | B1 | 2/2022 | Rigby |
| D945,379 | S | 3/2022 | Allender-Zivic |
| D945,865 | S | 3/2022 | Arnold |
| D957,919 | S | 7/2022 | Bredl |
| D968,944 | S | 11/2022 | Liu |
| D970,455 | S | 11/2022 | Xiao |
| D974,879 | S | 1/2023 | Wu |
| D975,030 | S | 1/2023 | Atwood |
| D976,690 | S | 1/2023 | Peng |
| D977,949 | S | 2/2023 | Li |
| D981,823 | S | 3/2023 | Hongmeng |
| D981,825 | S | 3/2023 | Hu |
| D991,780 | S | 7/2023 | Michael et al. |
| D996,373 | S | 8/2023 | Michael et al. |
| D997,106 | S | 8/2023 | Michael |
| D997,886 | S | 9/2023 | Michael |
| D997,887 | S | 9/2023 | Michael |
| D997,888 | S | 9/2023 | Michael |
| 2003/0061690 | A1 | 4/2003 | Finley et al. |
| 2004/0118798 | A1 | 6/2004 | Spiers et al. |
| 2005/0120652 | A1 | 6/2005 | Cacciani et al. |
| 2009/0094799 | A1 | 4/2009 | Ashel |
| 2009/0293233 | A1 | 12/2009 | Ho et al. |
| 2011/0260011 | A1 | 10/2011 | Yu et al. |
| 2012/0192925 | A1 * | 8/2012 | Grushkowitz ......... H02S 30/10 136/251 |
| 2014/0061396 | A1 | 3/2014 | Magno et al. |
| 2014/0326838 | A1 | 11/2014 | West et al. |
| 2014/0374544 | A1 | 12/2014 | Pearson et al. |
| 2015/0219248 | A1 | 8/2015 | Lares |
| 2016/0111996 | A1 | 4/2016 | Stephan et al. |
| 2016/0282018 | A1 * | 9/2016 | Ash ............... F24S 25/636 |
| 2018/0080579 | A1 | 3/2018 | Costigan |
| 2018/0366926 | A1 | 12/2018 | Schulte |
| 2019/0081469 | A1 | 3/2019 | Shea et al. |
| 2019/0149087 | A1 | 5/2019 | McPheeters et al. |
| 2020/0107466 | A1 | 4/2020 | Hjelmfelt et al. |
| 2021/0033220 | A1 * | 2/2021 | Laughlin ............. H02G 3/0443 |
| 2021/0213231 | A1 * | 7/2021 | Spear ............... A61M 16/0666 |
| 2022/0359102 | A1 * | 11/2022 | Michael ............. H02G 3/32 |
| 2022/0360059 | A1 | 11/2022 | Michael et al. |
| 2023/0245798 | A1 | 8/2023 | Michael et al. |
| 2023/0296192 | A1 | 9/2023 | Michael et al. |

OTHER PUBLICATIONS

International Search Report and Written Opinion for International Application No. PCT/US22/27478 dated Sep. 2, 2022.
International Search Report and Written Opinion for International Application No. PCT/US22/27792 dated Oct. 5, 2022.
Invitation to pay fees for International Application No. PCT/US2022/027792 dated Aug. 1, 2022, 2 pgs.
Invitation to pay fees for International Application No. PCT/US2023/015303 dated May 22, 2023, 2 pgs.
International Search Report and Written Opinion for International Application No. PCT/US2023/015303 dated Jul. 28, 2023, 13 pgs.
International Search Report and Written Opinion for International Application No. PCT/US2023/017566 dated Jun. 27, 2023, 9 pgs.

\* cited by examiner

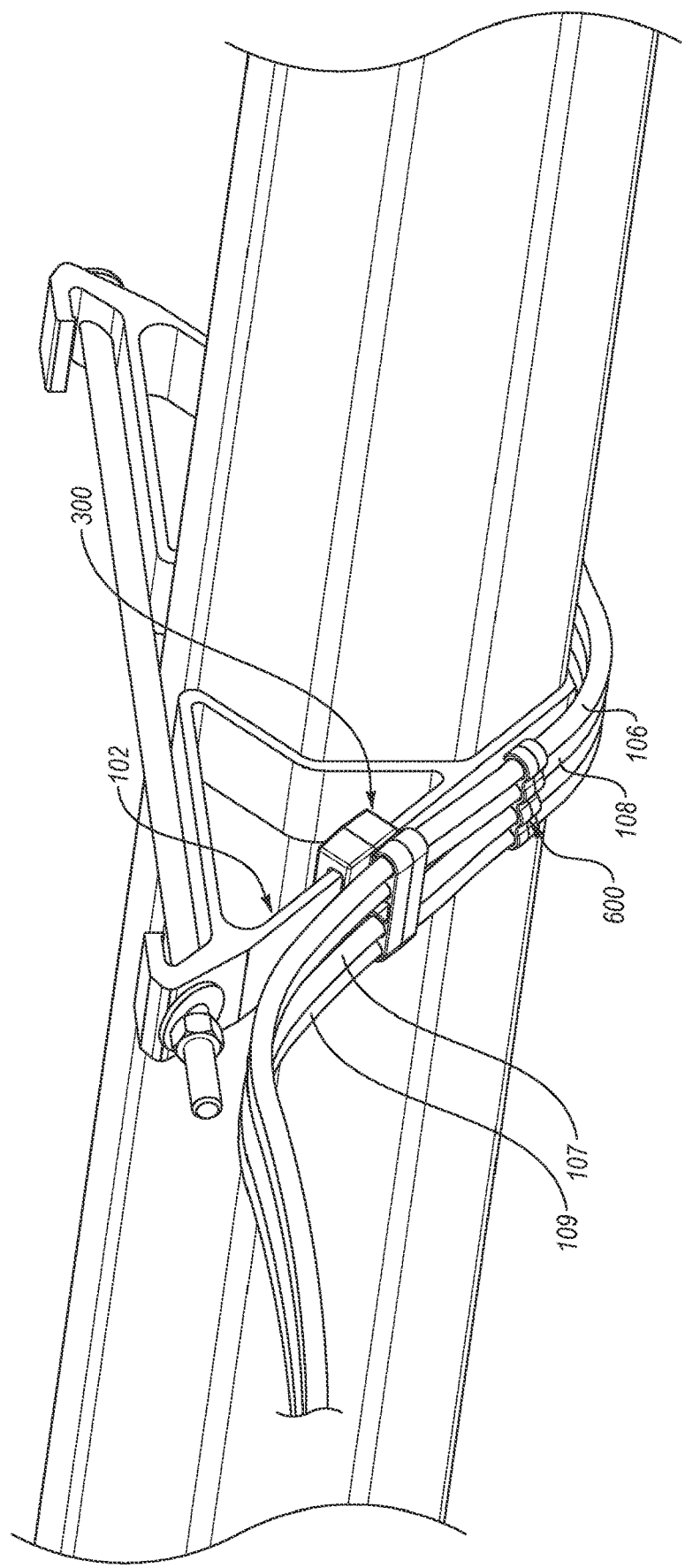

SOLAR CABLE RETENTION CLIPS AND SYSTEMS FOR STRUCTURE MOUNTING

CROSS-REFERENCE TO RELATED APPLICATIONS

This patent application claims priority to U.S. Provisional Application No. 63/201,587 filed May 5, 2021 and to U.S. Provisional Application No. 63/262,848 filed Oct. 21, 2021, which provisional applications are incorporated herein by specific reference in their entirety.

BACKGROUND

Field

The present disclosure relates solar panel cable clips with a clamp for mounting to support structures and cable channels for receiving, securing and organizing solar panel cables in solar panel installations.

Description of Related Art

Solar power has long been considered a niche utility. It is considered desirable from an environmental and political standpoint, but perhaps not economically feasible for generating enough power to make a meaningful contribution to the grid. However, as the problems associated with our dependence on fossil fuels have become better understood, more attention has been paid to so-called alternative energy such as solar power. This attention has led to significant technological and policy advances, such that solar power is now quite prevalent, and more economically feasible.

Technological advances in the generation of solar energy have occurred in multiple areas, including collector material and structure, and wiring infrastructure. Wiring infrastructure, however, continues to present challenges, particularly in large scale solar photovoltaic (PV) panel array installations. Proper wire management is vital to the health of the PV system. Damaged wire insulation can lead to ground-faults, system downtime and fire. Moreover, PV systems are installed in various geographic locations, and experience extreme weather and environmental conditions. The wiring infrastructure must defy wind and weather conditions for many years and must reliably safeguard various electricity yields. The sheer number of cables associated with a typical PV array installation adds to the difficulty in providing efficient and effective wire management.

In addition, PV modules are often mounted to solar tracking systems and the like via bracket or clamp systems. The PV modules are moved to maximize sun exposure. Thus, it is desirable to orient the cables in a manner that accommodates movement of respective PV modules, and in a manner that avoids entanglement or damage to the cables themselves.

To date, there are inadequate tools available to organize and manage the large number of cables often found within a typical PV array installation. Often, installers are left to using zip ties or the like, which, at best, groups cables in a haphazard manner. Such approaches make it difficult to organize cables with respect to the panels and the panel support structures. Moreover, for purposes of repair and maintenance, this approach requires ties to be cut, and then re-established with new ties, which is time consuming, and can lead to damage to the cables/wires when a zip tie is cut.

The claimed subject matter is not limited to embodiments that solve any disadvantages or that operate only in environments such as those described above. This background is only provided to illustrate examples of where the present disclosure may be utilized.

SUMMARY

In some embodiments, a cable retention clip can include a structure retention section and a cable retention section. The structure retention section can have a clamp body having a base wall and two side walls forming a planar slot therebetween. There can be at least one grip element in the slot that is coupled with at least one of the two side walls. The cable retention section can be coupled to the structure retention section. The cable retention section can include a clip body defining at least two cable retention channels. Each cable retention channel can have a cable opening (e.g., slot into lumen) that extends the length of the respective cable retention channel to form a C-shape. Each cable retention channel can be parallel with each other cable retention channel. In some aspects, the clip body defines at least a pair of the cable retention channels forming a ω shape. In some aspects, the at least two cable retention channels consist of cable retention channels that have the same size. In some aspects, there are four cable retention channels that have the same size. In some aspects, the cable openings of the at least two cable retention channels are configured as slots that open towards the structure retention section. In some aspects, the cable openings of the at least two cable retention channels are configured as slots that open away from the structure retention section. In some aspects, the structure retention section is a same resilient material as the cable retention section and integrated therewith.

In some embodiments, the cable retention clip can include a clip body that defines at least four cable retention channels with at least two pairs of the at least four cable retention channels being separated by a separator. The separator can have a first branch that forms a first arm of a first pair of cable retention channels forming the ω shape and having a second branch that forms a second arm of a second pair of cable retention channels forming the ω shape. The cable retention channels are arranged to have the parallel channel axes.

In some embodiments, a cable arrangement can include the cable retention clip of one of the embodiments and at least two solar cables. Each solar cable can be located in the respective cable retention channel of the cable retention clip.

In some embodiments, a cable clip can be coupled to at least one solar cable. The cable clip can define at least two second cable retention channels that are arranged to have parallel channel axes. Each second cable retention channel has an inlet opening extending a length of the respective second cable retention channel so that each second cable retention channel forms a C-shape. Each second cable retention channel can be separated from an adjacent second cable retention channel by a second cable separator. The cable clip has at least a pair of the second cable retention channels forming a ω-shape.

In some embodiments, a cable clip is coupled to at least one solar cable. The cable clip can define at least two pairs of second cable retention channels that are separated by a branched cable separator. The branched cable separator can have a first branch that forms a first arm of a first pair of second cable retention channels forming the ω-shape and having a second branch that forms a second arm of a second pair of second cable retention channels forming the ω-shape.

The at least four cable retention channels are arranged to have the parallel channel axes.

In some embodiments, a cable clip is coupled to at least one solar cable. The cable clip can define at least four second cable retention channels with each second cable retention channel being separated by a second cable separator. Two second cable separators have a pair of curved arms that form a first pair of second cable retention channels with one second cable separator having a stubbed central protrusion thereby forming the ω-shape. The at least four second cable retention channels are arranged to have the parallel channel axes. At least one of the second cable retention channels includes a larger size than at least three of the second cable retention channels that have a same smaller size. The outer second cable retention channels form hook shapes that hook toward each other.

In some embodiments, a solar installation can include the cable arrangement of one of the embodiments and at least one solar panel operably coupled with at least one of the solar cables.

In some embodiments, a kit can include the cable retention clip of one of the embodiments and a cable clip of one of the embodiments.

In some embodiments, a method of arranging solar cables can include: providing the cable retention clip of an embodiment to a solar installation; sliding the planar slot of the cable retention clip onto a planar structure of the solar installation to couple the cable retention clip to the structure; and inserting at least two cables into at least one or two cable retention channels of the cable retention clip. It is noted, that either the planar slot of the structure retention section or the cable retention channels can be mounted first, and either step can be performed in any order.

A method of hanging wires can be provided. Such a method can include using the retention clips described herein to couple lead wires and/or secondary wires to structural supports via a support clamp that is adapted to clamp onto a support member for wire hanging in above ground solar installations. The method can include clamping the support clamp of the cable retention clip onto a structural support. The method can include taking a wire cable and pressing it into a lead cable retention channel, such that the body flexes to receive the wire cable, and then retracts to form the channel around the wire cable. That is, a curved arm, such as a C-shape, can be flexed laterally to open the channel to receive the cable, and then the curved arm retracts to its normal shape to retain the wire in the channel. The mounting to the structural support or pressing cables through the slots into the lumen can be performed in any order.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 1D and 1E illustrate different perspectives of another embodiment of a cable retention clip in a typical solar panel installation.

DETAILED DESCRIPTION

Figure 1A:
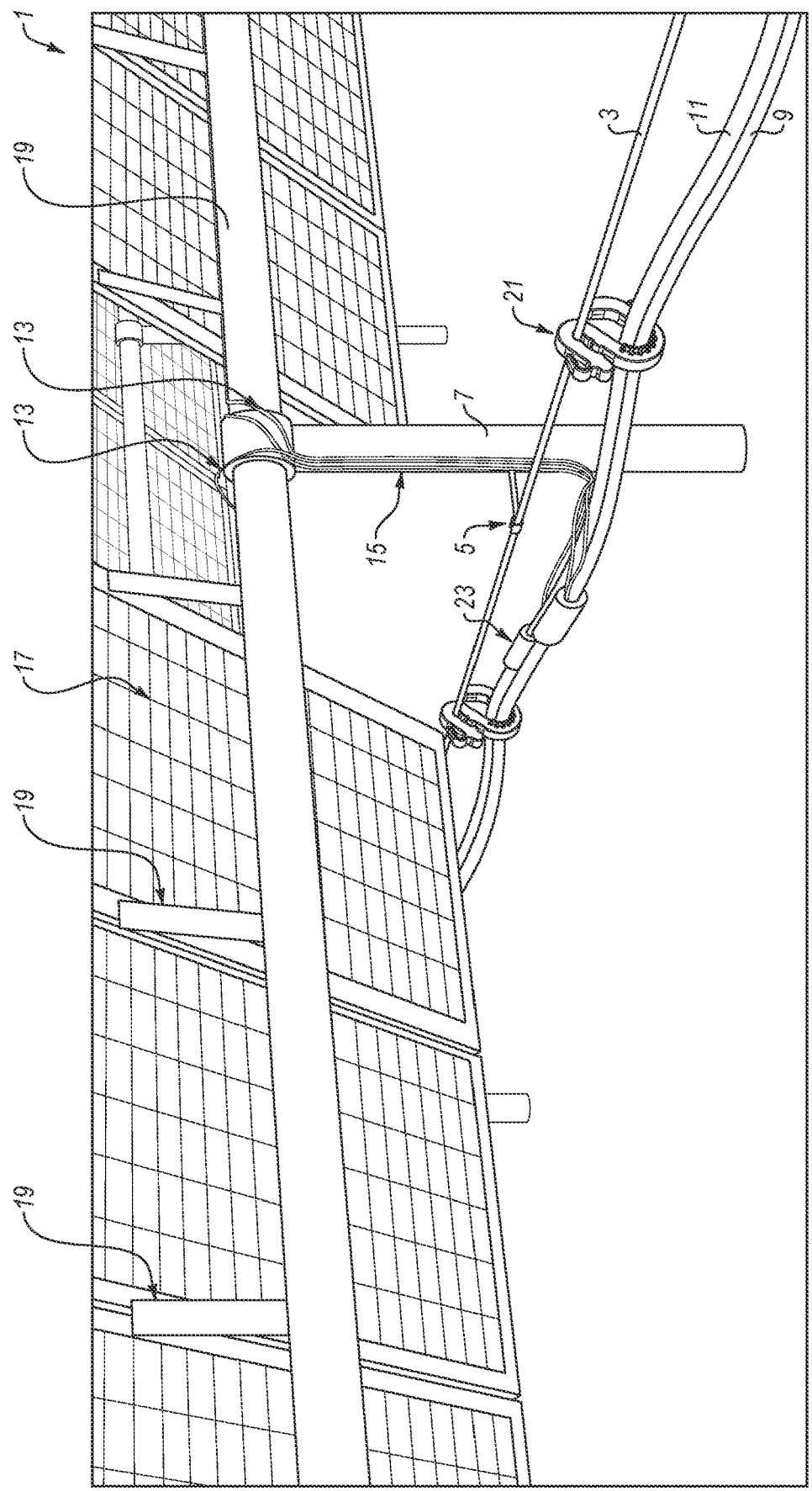
FIG. 1A illustrates an example solar power wire installation that includes a messenger cable coupled to the structural pile and suspending the lead wires.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to cable retention clips and systems suitable for retention and management of cables and wires within a photovoltaic (PV) solar panel array installation. Individually, disclosed cable retention clip embodiments can be used to retain a plurality of cables together in an organized manner, and in a manner that allows for easy installation and/or later repair to the cables and/or corresponding panels. For example, the cable retention clips described herein can include one or more channels adapted for coupling to a big lead assembly (BLA) lead wire cable and/or for coupling to a plurality of secondary wire cables. The cable retention clip includes a portion that slidingly clamps onto a support structure (e.g., friction fit, resilient force) and a portion that receives the individual cables into cable channels. The sizing of the cable channels can be for BLA sized cables and/or secondary wire cables.

In some embodiments, a cable retention clip can be configured to detachably connect to a support structure (e.g., bracket) associated with a PV solar panel. The retention clip can include a cable retention section (e.g., cable clip section) and a support structure retention section (e.g., clamp section). The cable retention section can include two or more cable retention channels, with each channel being configured to detachably receive a section of a cable associated with the PV solar panel. As such, each channel has a channel opening for normal or lateral pressing of the cable through the channel opening into the channel. For example, the cable can be aligned parallel with the axis of the channel, and then pressed through the channel opening into the channel. Also, the cable retention clip can include the support structure retention section attached to the cable retention section. The structure retention section can be configured to detachably connect to a support structure associated with the PV solar panel. In some aspects, the support structure retention section includes a bracket retention cavity (or cavity to retain other support structure with planar structure) that is sized and shaped so as to engage a corresponding surface of a support structure, such as a PV solar panel support bracket, in a detachable manner. In some aspects, the support structure retention section includes a grip element which deforms as the retention clip is slidingly placed on a planar support structure of a PV solar panel installation so as to exert a force preventing the retention clip from becoming detached from the support structure. A cable retention system can further include one or more cable clips detachably affixed to one or more cables detachably connected to the structure retention.

FIG. 1A shows an example solar infrastructure 1. FIG. 1A illustrates an example solar infrastructure 1 having a plurality of solar panels 17 mounted to piles 7. The solar panels 17 are mounted to frames 19 that are mounted to the piles 7 for an above ground installation. The example solar infrastructure 1 is includes a messenger cable 3 mounted via a hanger arm 5 to the pile 7 installed in the ground. The big lead assembly (BLA) wires BLA red 9 (e.g., positive) and BLA black 11 (e.g., negative) wire cables hang from the messenger cable 3. A cable hanger 21 is shown to hang from the messenger cable 3 to carry the BLA red 9 and BLA black 11 wire cables. BLA red 9 and BLA black 11 wire cables are trunk cables or lead cables that carry the electricity from a group of solar panels 17 to a central component. The panel red 13 (e.g., positive) and panel black 15 (e.g., negative) wire cables, which are branch wires (e.g., secondary wires), are shown to run from the solar panel 17 to the pile 7 (e.g., pile shown as round, but an H-pile can be used). There are junction connectors 23 connecting the panel red cables 13 to the BLA red cable 9 and the panel black cables 15 to the BLA black cable 11. As shown, the messenger cable 3 is required to structurally support the BLA red 9 and BLA black 11 wire cables because they are not capable of being self-supporting. In some embodiments, the present invention provides a cable retention clip that can be used in the solar infrastructure 1, such as to couple the secondary wire cables or the lead wire cables to a structural support.

Figure 1B:
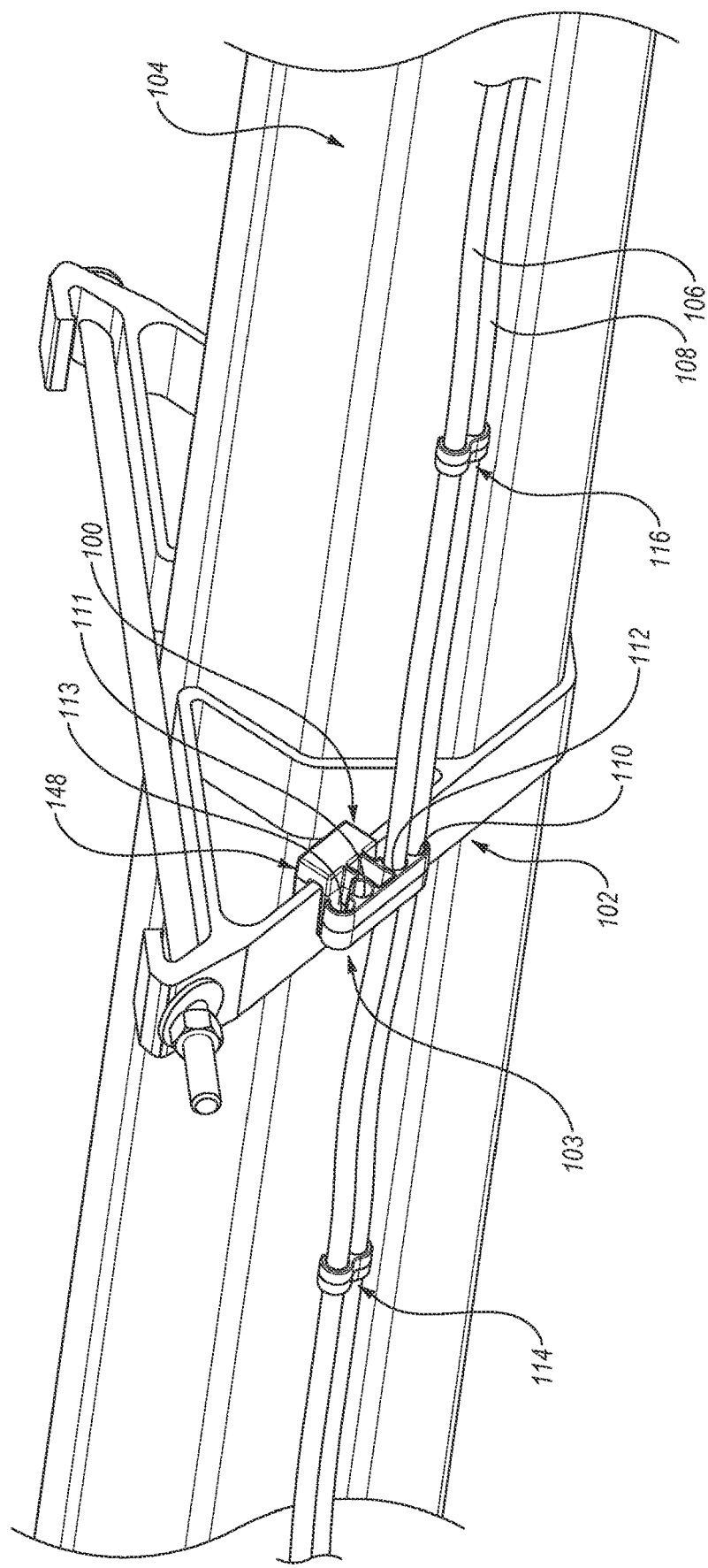
FIG. 1B illustrates a perspective view showing one example of a cable retention clip and a cable clip as used in a typical solar installation.

Reference is first made to FIG. 1B, which illustrates one example of a cable retention clip, denoted generally at 100. As is shown, the retention clip 100 is detachably attached to a solar mounting system, one example of which is shown here as a mounting bracket, denoted at 102. The mounting bracket 102 can be affixed to any appropriate mounting structure, such as a solar tracker torsion beam 104 or any other suitable support structure.

FIG. 1B shows the cable retention clip 100 being mounted to a planar substrate of a component of a solar installation. A mounting bracket 102 may be used to support a PV solar panel (not shown) via a clamp, rail, H-pile, I-beam, cross-beam, and/or other combinations of structural components as well as PV components. As is known, electrical power generated by a PV solar panel in the form of direct current (DC) generated by a solar panel is conducted to combiner boxes, inverters and the like (not shown) by way of one or more cables, examples of which are denoted at 106, 108. Depending on the nature of the solar installation, there can be a large number of PV solar panels, resulting in a large number of cables. Thus, in a typical installation, many cables need to be oriented, routed and managed. The cable retention clip 100 includes the structure retention section 148 adapted to slidingly clamp onto a planar structural member.

Figure 1C:
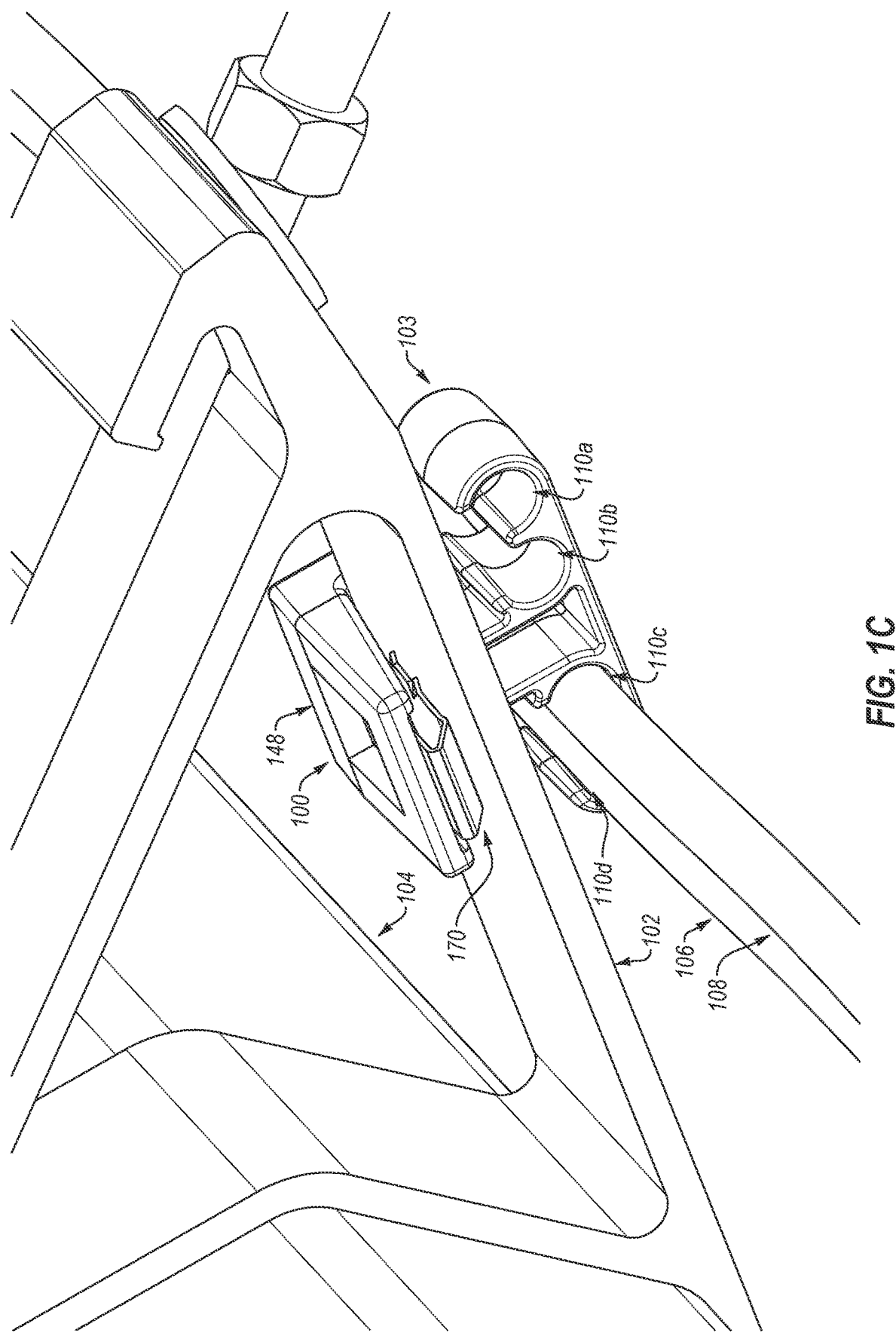
FIG. 1C illustrates another perspective view of the retention clip in the solar installation of FIG. 1B.

In the example shown in FIGS. 1B and 1C, cables 106, 108 are each held in place with respect to the bracket 102 by way of the retention clip 100 via a cable retention section, denoted at 103. In the example shown, the cable retention section 103 includes one or more cable retention channels 110, 112, 111, 113 (described further below). In this way, the cables can be detachably secured with respect to a bracket 102, thereby allowing for easy installation and repair. Moreover, securing the cables in this manner ensures orderly cable management, thereby avoiding damage and entanglement—particularly in the case where the panels/bracket are moveable, such as in a solar tracker application.

Further management of the cables can be provided by way of one or more cable clips, such as is denoted at 114 and 116. In the example shown, the cable clips 114, 116 retain cables 106 and 108 in a substantially parallel and detachable manner, further ensuring organization of the cables relative to the bracket and the support configuration. Again, this maintains cable management and organization by reducing the opportunity for entanglement, exposure or damage.

Referring next to FIG. 1C, additional details of the example retention clip 100 are shown. As is shown, the structure retention section 148 may include a slot opening housing a grip element 170 that functions as a resilient clamp. The grip element 170 may be attached to a structure retention section 148 and in contact with the bracket 102 when the retention clip 100 is detachably attached to the bracket 102.

Figure 1E:
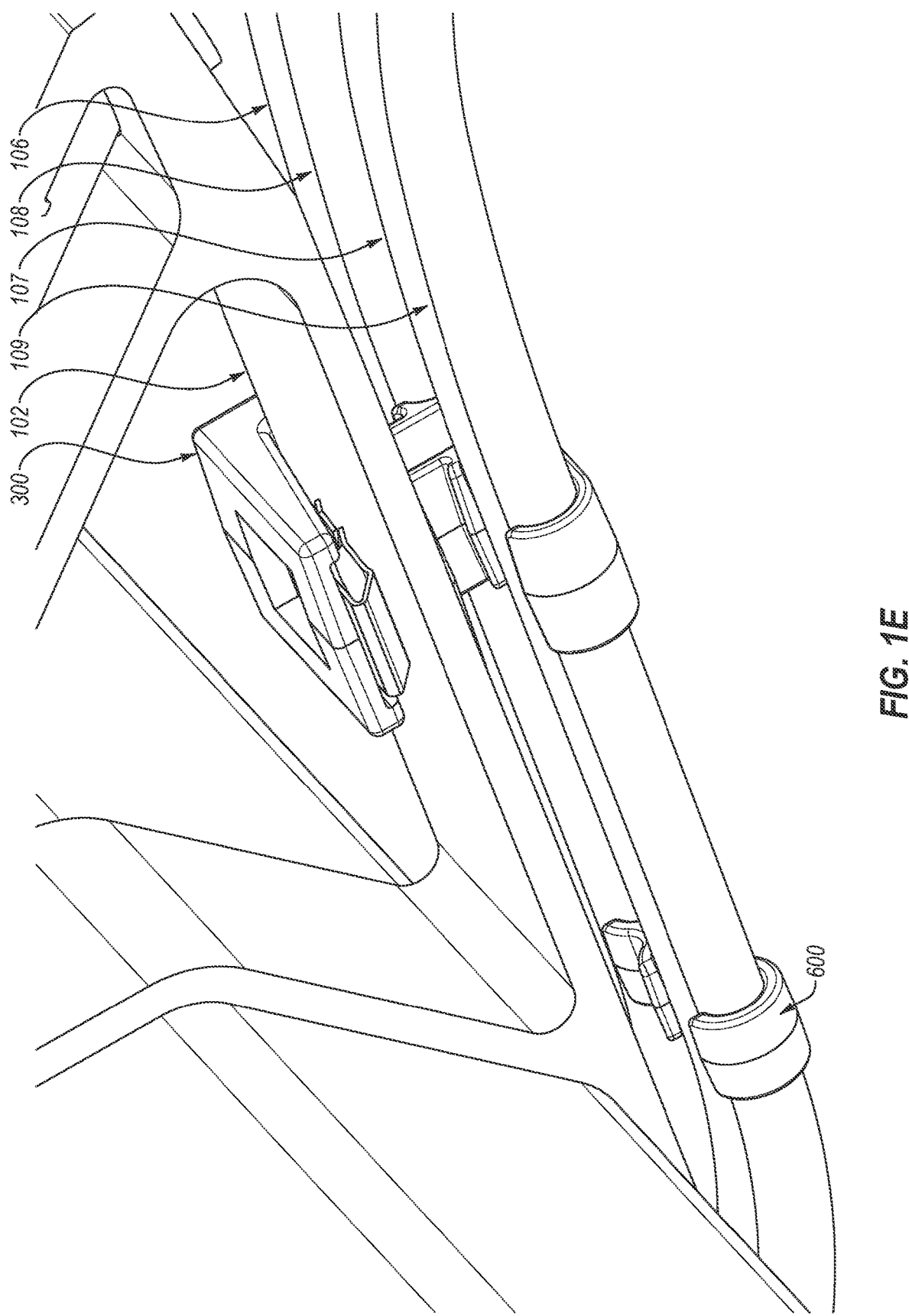

Reference is next made to FIGS. 1D and 1E, which illustrate another example of a cable retention clip, denoted here at 300. The retention clip 300 is similar to the retention clip 100 of FIGS. 1B and 1C in most respects. However, in the embodiment of FIGS. 1D and 1E, the orientation of the cable retention section (denoted here at 103) is oriented differently with respect to the structure retention section (denoted here at 148). In this way, the orientation of the cables (denoted here at 106, 108, 107 and 109) are along the axis of the bracket 102 as opposed to the perpendicular orientation of FIGS. 1B and 1C. It will be appreciated that any desired orientation can be provided by altering the angular relationship between the cable retention section 103 and the structure retention section 148, depending on the needs or configuration of a given application.

Figure 1F:
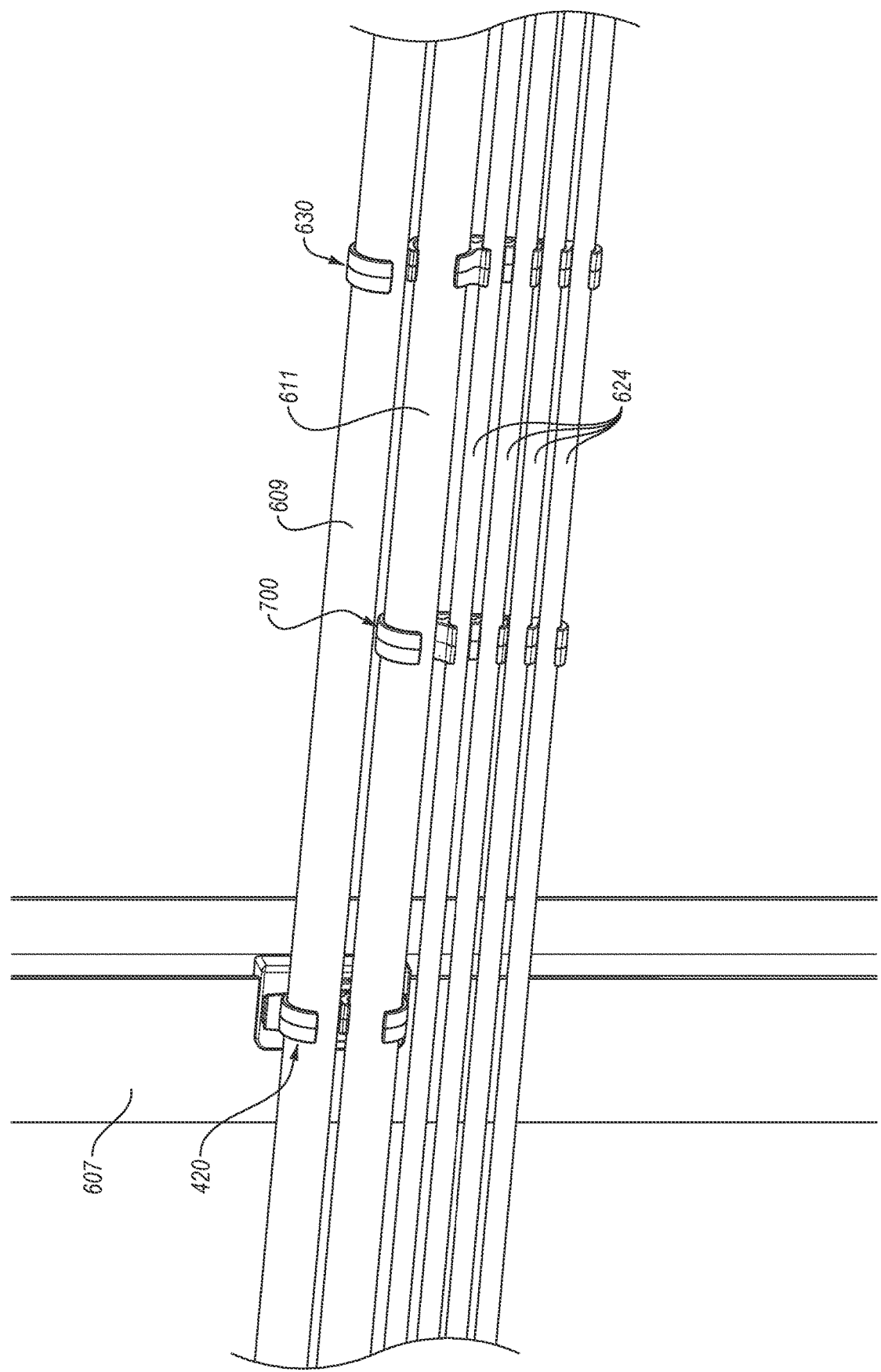
FIG. 1F is a perspective view of a solar installation having solar panels (see FIG. 1A) mounted on piles, with a cable arrangement having a solar cable retention clip retaining a pair of lead wires to the pile and another solar cable clip retaining a set of secondary wires to the pair of lead wires.

FIG. 1F. illustrates an embodiment of a solar cable installation where there is no messenger cable and both of the BLA cables 609, 611 are coupled to the pile 607, through a direct coupling, such as to the cable retention clip 420 (with or without a hanger arm). The first BLA cable 609 is coupled to the cable retention clip 420 that is coupled with the pile 607. The second BLA cable 611 is also coupled to the cable retention clip 420 that is coupled to the pile 607. The second BLA cable 611 is coupled directly to the same cable retention clip 420 that is coupled with the first BLA cable 609. Additionally, hanging multi-cable clips 700, 630 can be used to couple secondary wires 624 to the pair of the first BLA cable 609 and second BLA cable 611. As shown, hanging multi-cable clip 630 has one conduit for both of the BLA cables 609,611 and single conduits for the secondary cables 624. Also, another type of hanging multi-cable clip 700 can be used to couple secondary cables 624 to the second BLA cable 611. As shown, hanging multi-cable clip 700 has one conduit for one of the BLA cable and single conduits for the secondary cables 624.

Referring next to FIGS. 2A-2F, additional details of the example solar cable retention clip 100 are shown. As is shown, the cable retention section 103 of retention clip 100 may have one or more cable retention channels, four of which are shown in the example at 110*a*, 110*b*, 110*c* and 110*d*. As is shown in the example, each retention channel provides a cable receiving portion having a suitable shape—here a 'C' shape—so as to receive and retain in a detachable manner a corresponding cable (FIGS. 1B and 1C). Each retention channel includes an adequate slot opening, denoted here at 118*a*, 118*b*, 118*c* and 118*d*, to detachably receive and "clamp" a corresponding cable. The size (e.g., the diameter, circumference, lumen cross-sectional area, etc.) of a given retention channel will depend on the size of the outer circumference of a given cable (typically dictated by the gauge of the cable). Similarly, the dimensions of a given retention channel opening 118*a*, 118*b*, 118*c* and 118*d* is such so as to receive the cable in a manner to adequately retain it, and yet allow its removal if needed. The retention ability can be enhanced depending on the material used for the clip 100. For example, a resilient plastic material or the like enables a "clip" effect, so as to allow some expansion of the channel opening 118*a-d* to accommodate insertion of the cable by way of a pressing force on the cable laterally into the retention channel opening. Once the cable is inserted, the retention channel can slightly retract to its original shape, thereby retaining the cable within a given retention channel 110*a-d*. In addition, the flexibility of the outer surface of a given cable may also be utilized to facilitate insertion and detachable retention within a given retention channel—e.g., the outer surface, such as deformable plastic, contracts slightly to allow insertion via a channel opening and, once inserted, slight expansion allows the cable to be resiliently and detachably retained within the channel. Disposed between each retention channel is a cable separator portion, such as is denoted at 119 in the figures. This maintains adequate separation between adjacent cables, further ensuring against inadvertent shorts, for example.

As noted above, the example retention clip 100 also includes the structure retention section 148. The structure retention section 148 can be formed integrally (for example, utilizing a suitable molding process if plastic) with the cable retention section 103 or can be formed as two (or more) distinct pieces that are attached. As is shown, in one example the structure retention section 148 defines a structure retention channel denoted at 150, which is configured as an elongate slot, extending between each side. As can be seen in FIGS. 1B and 1C, the structure retention channel 150 is sized and shaped so as to be capable of substantially conforming with at least a portion of a corresponding section of bracket 102 (e.g., structure) in order to attach thereto. Moreover, the structure retention channel 150 includes a back surface 152 defined by a back wall, a top surface 154 defined by a top wall, and a bottom surface 156 defined by a bottom wall that together resiliently engage the outer surface of the bracket 102, as denoted in FIGS. 1B and 1C. In this way, the retention clip 100 may be detachably fastened to the bracket 102, thereby maintaining the cables in a desired relative fashion to the bracket 102 yet allowing for removal and/or reattachment. However, the arrangement can consider the back surface 152 to be a base surface on a base wall, the top surface 154 and bottom surface 156 can be side surfaces on side walls.

Figure 2A:
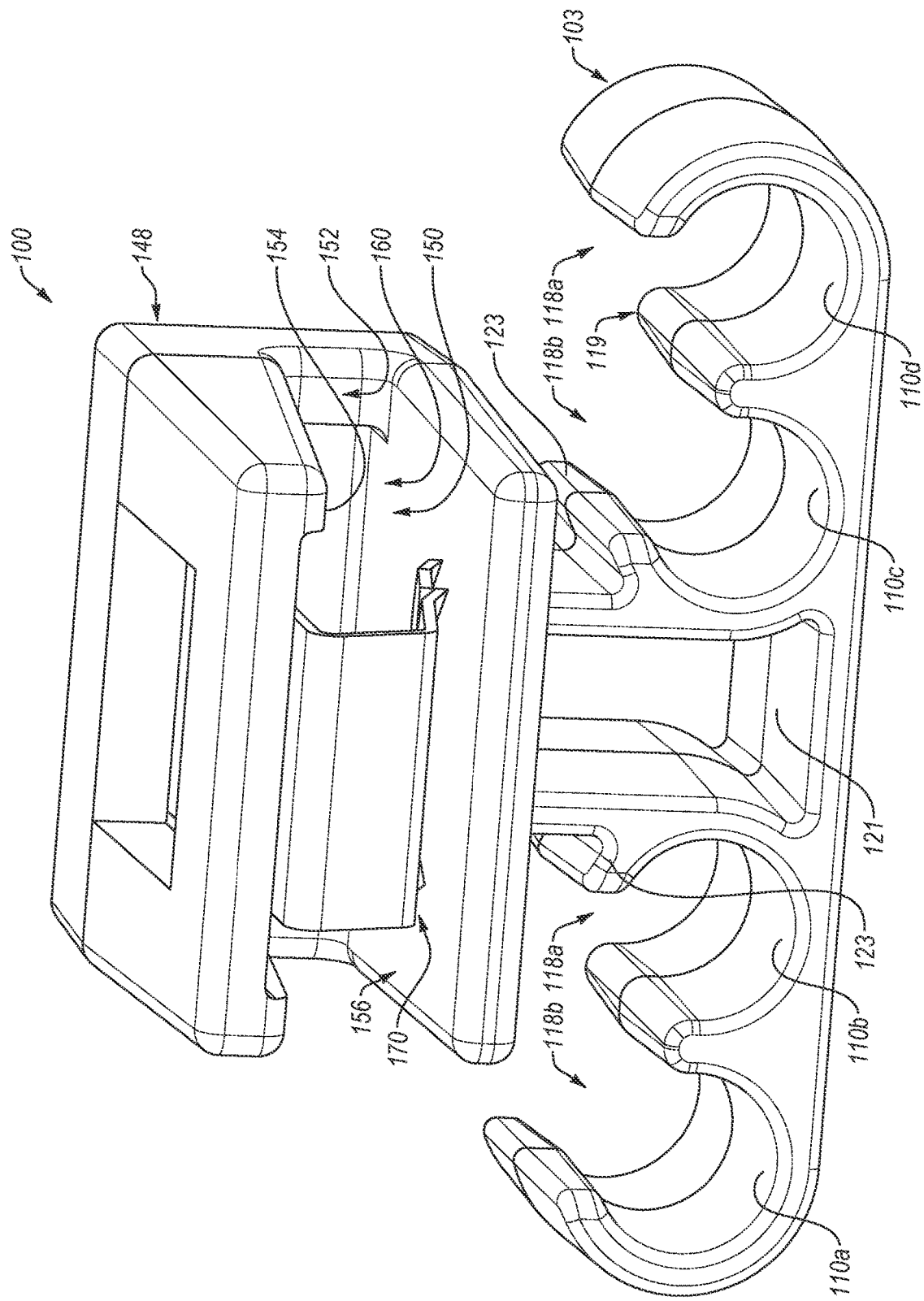
FIG. 2A is a front perspective view of an embodiment of a solar cable retention clip.
Figure 2B:
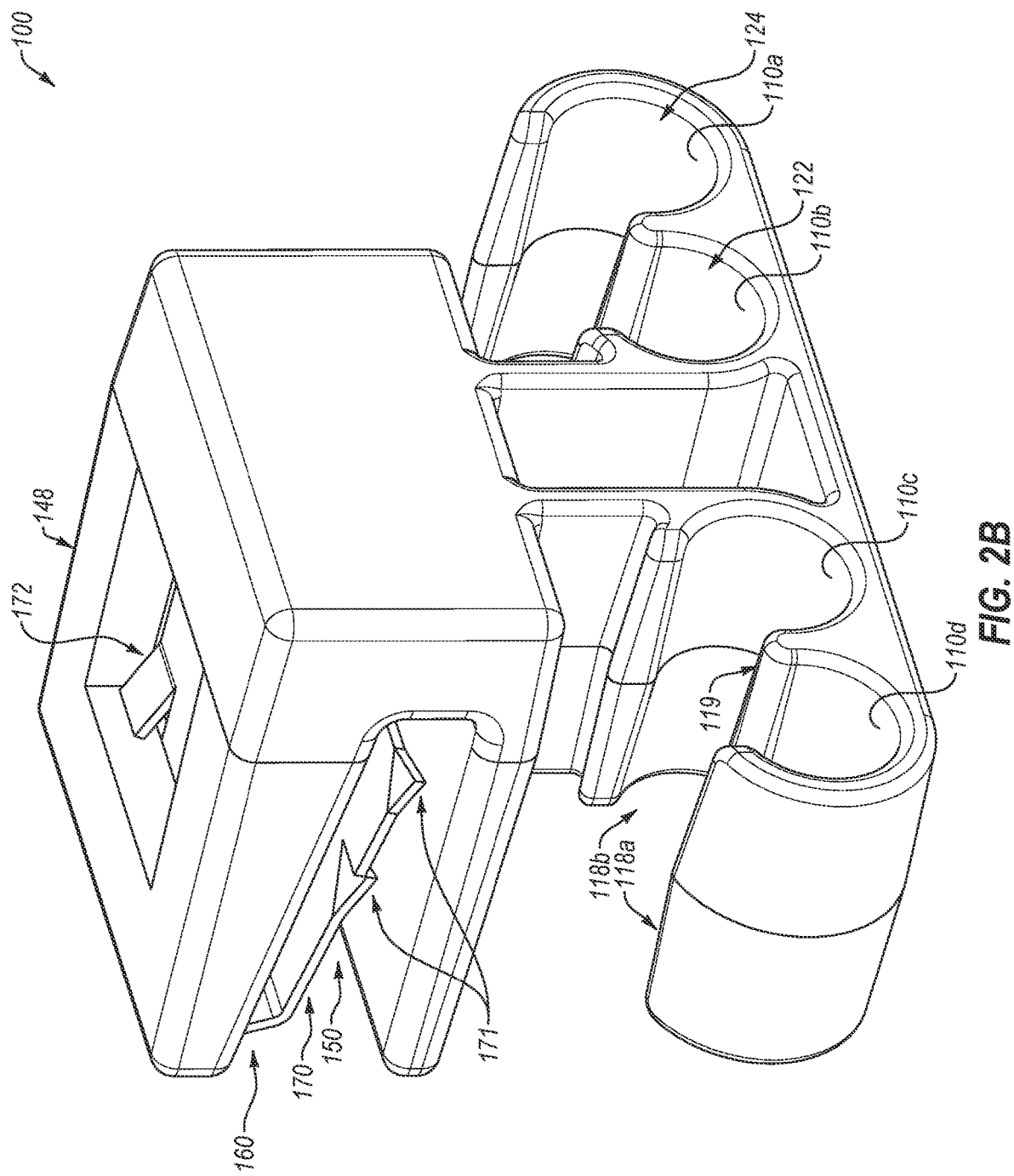
FIG. 2B is a back perspective view of the solar cable retention clip of FIG. 2A.

The structure retention section 148 may include the grip element 170 as shown in FIGS. 2A-2B. The grip element 170 is formed of a material that causes it to resist deformation and return to its original shape after deformation. In some embodiments, the grip element 170 is metal, but can be plastic. The grip element 170 may provide increased grip strength to the bracket retention portion 148. The grip element 170 may bend as the grip retention portion 148 is placed on the bracket 102 such that the grip element 170 is pushed towards the top surface 154 of the structure retention channel 150 as shown in FIG. 1C. The grip element 170 may exert a force on the bracket 102 in a direction substantially towards the bottom surface 156 of the structure retention channel 150, preventing the structure retention section 148 from becoming detached from the bracket 102.

As is shown in further detail in FIG. 2A, the interior shape and dimensions of the structure retention channel 150 substantially correspond to that of a corresponding outer surface of a bracket, such as that denoted at 102. In one embodiment, the structure retention channel 150 tapers towards the rear surface 152 from the slot opening 160, so as to provide a friction fit or other tapered "clamp" function to enhance the gripping force on the outer bracket surface. Again, the material used for the structure retention section 148, such as a plastic material, may provide additional resiliency so as to enhance the clamping force applied to the bracket, thereby securely retaining the retention clip 100 with respect to the bracket.

FIG. 2B illustrates a back perspective view of the retention clip 100. In this view, additional details of the grip element 170 are visible. The grip element 170 may include teeth 171 and retention spurs 172. The teeth 171 may be in contact with the bracket 102 when the retention clip 100 is attached to the bracket 102. The teeth 171 may serve to prevent the bracket 102 from slipping out of the structure retention channel 150. The retention spurs 172 may serve to hold the grip element 170 firmly in the structure retention section 148 by bracing against walls of the aperture in the structure retention section. The retention spurs 172 may serve to brace the grip element 170 to the walls of the aperture so as to prevent the grip element 170 from moving relative to the structure retention section 148; however, a recess in the structure retention channel 150 may be used instead of an aperture.

The retention spurs 172 may be formed in such a way so as to allow for removal of the grip element 170 from the structure retention section 148. For example, the retention spurs 172 may be formed so as to allow movement of the grip element 170 towards the bottom surface 156 of the structure retention channel 150 to allow for removal of the grip element 170. In some embodiments, the grip element 170 may be formed in such a way so as to apply force to the bottom surface 156 and the top surface 154 of the structure retention channel 150 when the retention clip 100 is not attached to the bracket 102 in order to retain the grip element 170 in place.

FIGS. 4A-4G illustrate various views of the grip element 170.

Figure 2C:
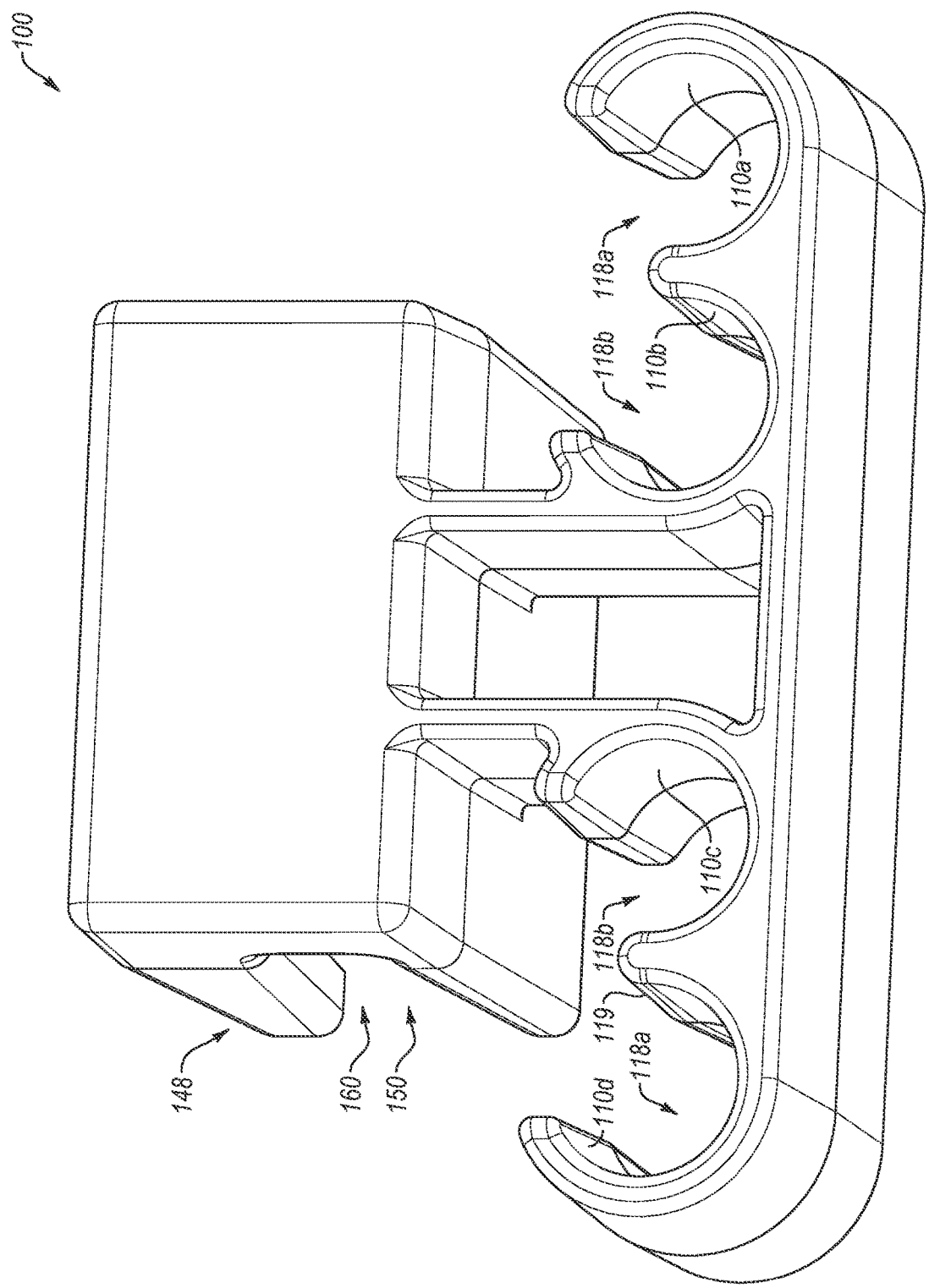
FIG. 2C is a back view of the solar cable retention clip of FIG. 2A.
Figure 2D:
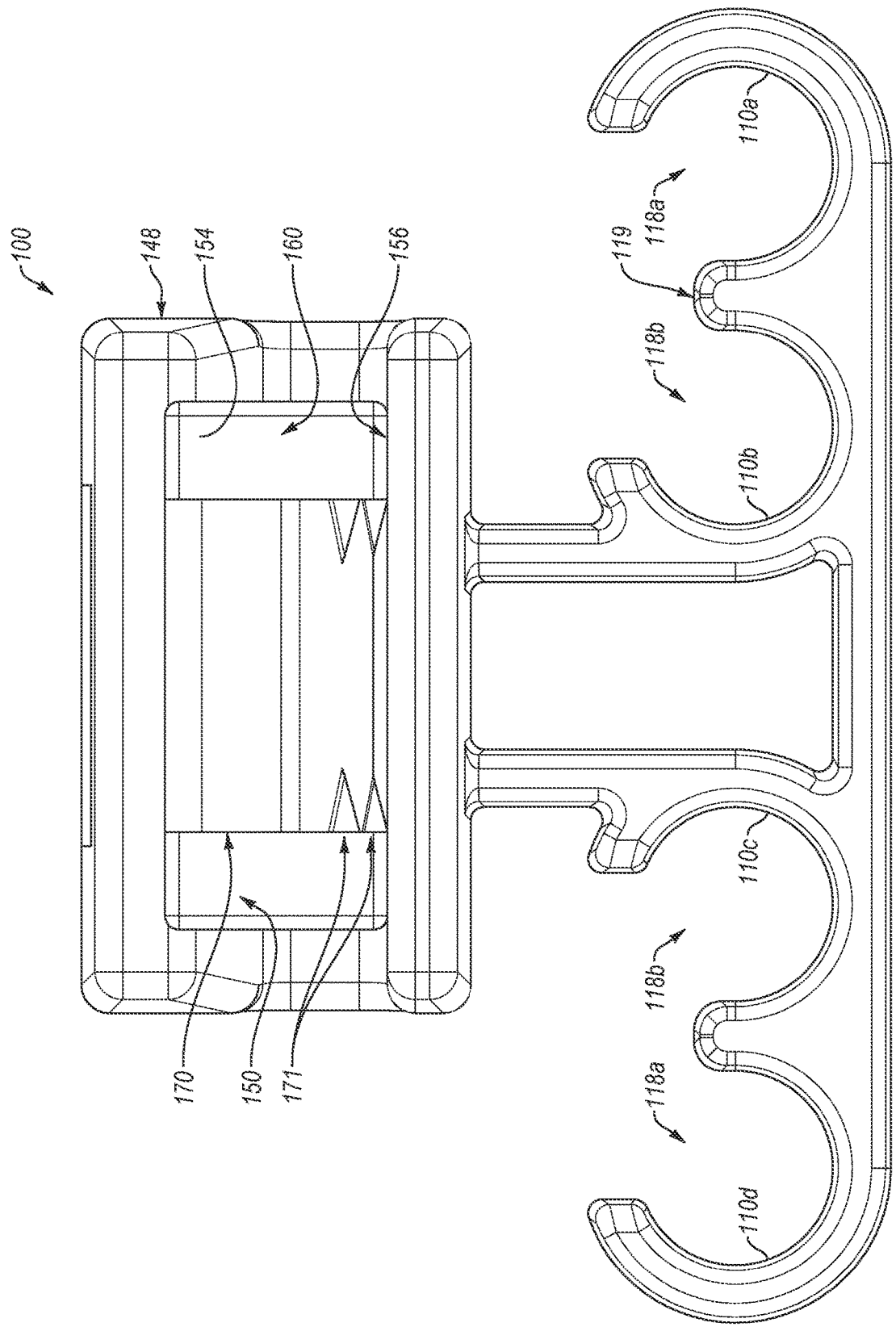
FIG. 2D is a front view of the solar cable retention clip of FIG. 2A.
Figure 2F:
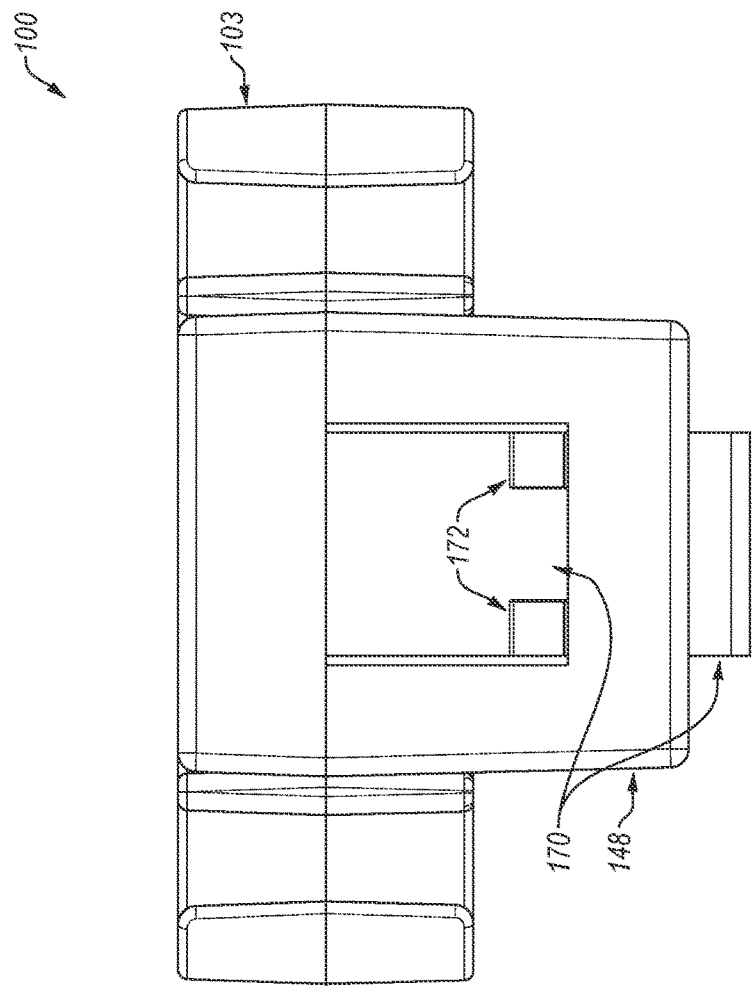
FIG. 2F is a top view of the solar cable retention clip of FIG. 2A.
Figure 2E:
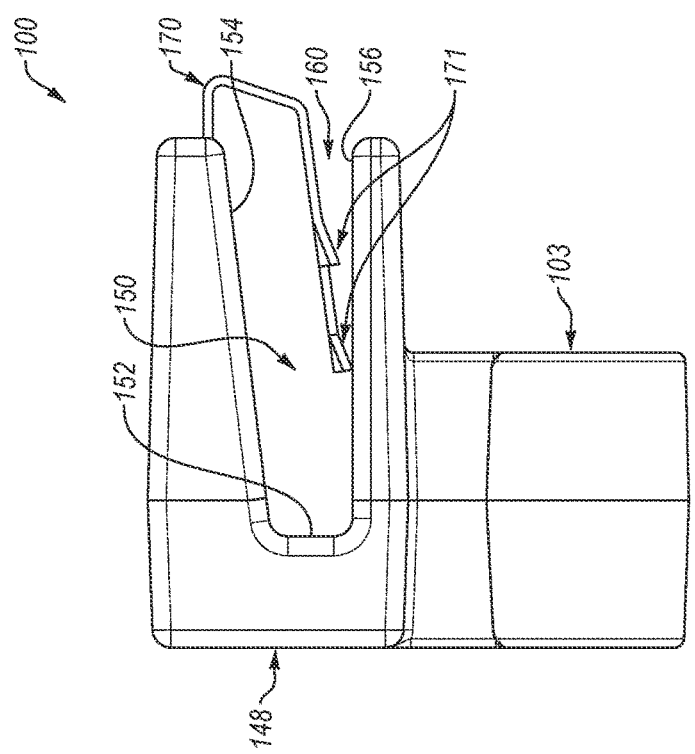
FIG. 2E is a side view of the solar cable retention clip of FIG. 2A.
Figure 3A:
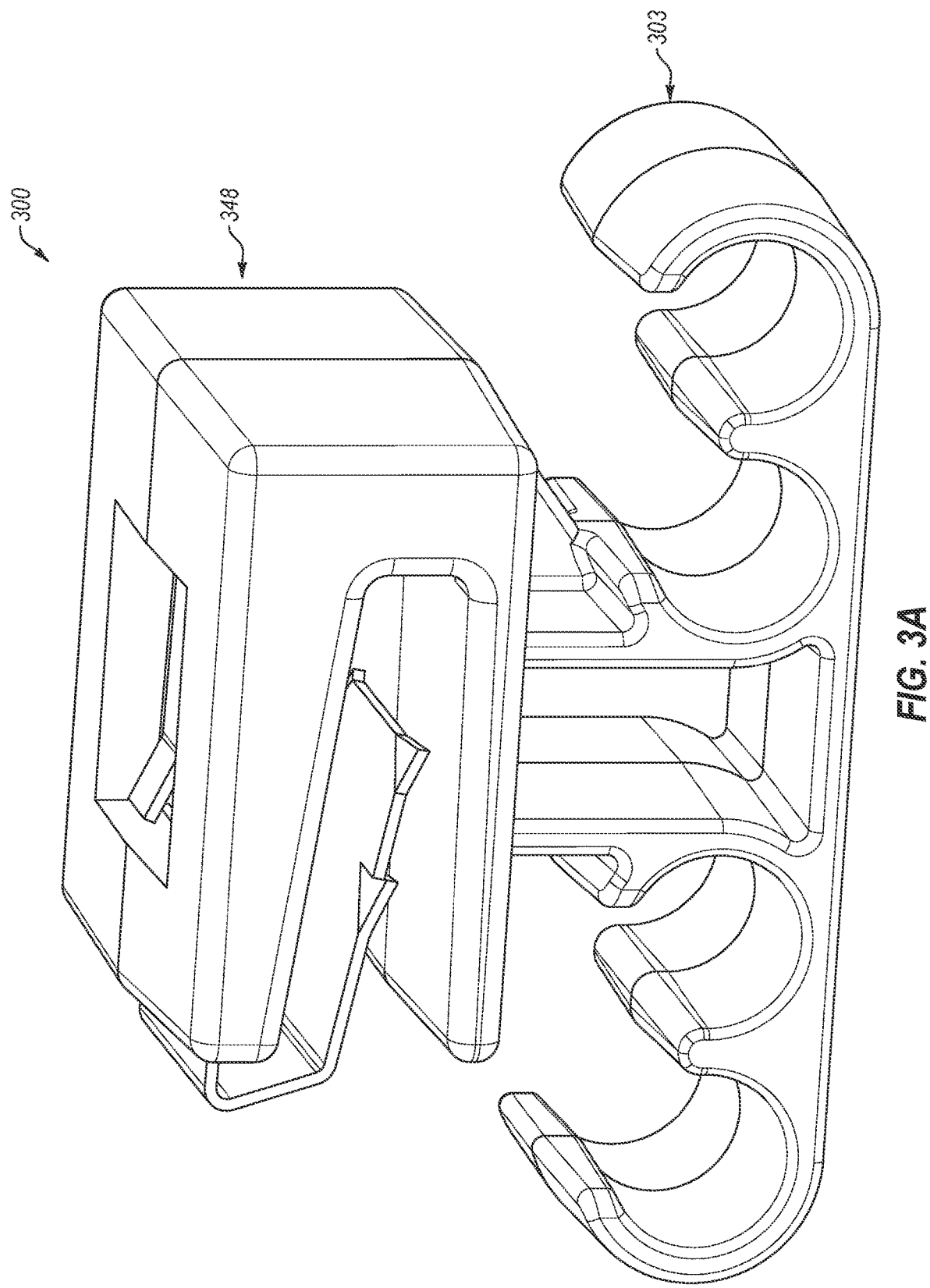
FIG. 3A is a front perspective view of another embodiment of a solar cable retention clip.
Figure 3B:
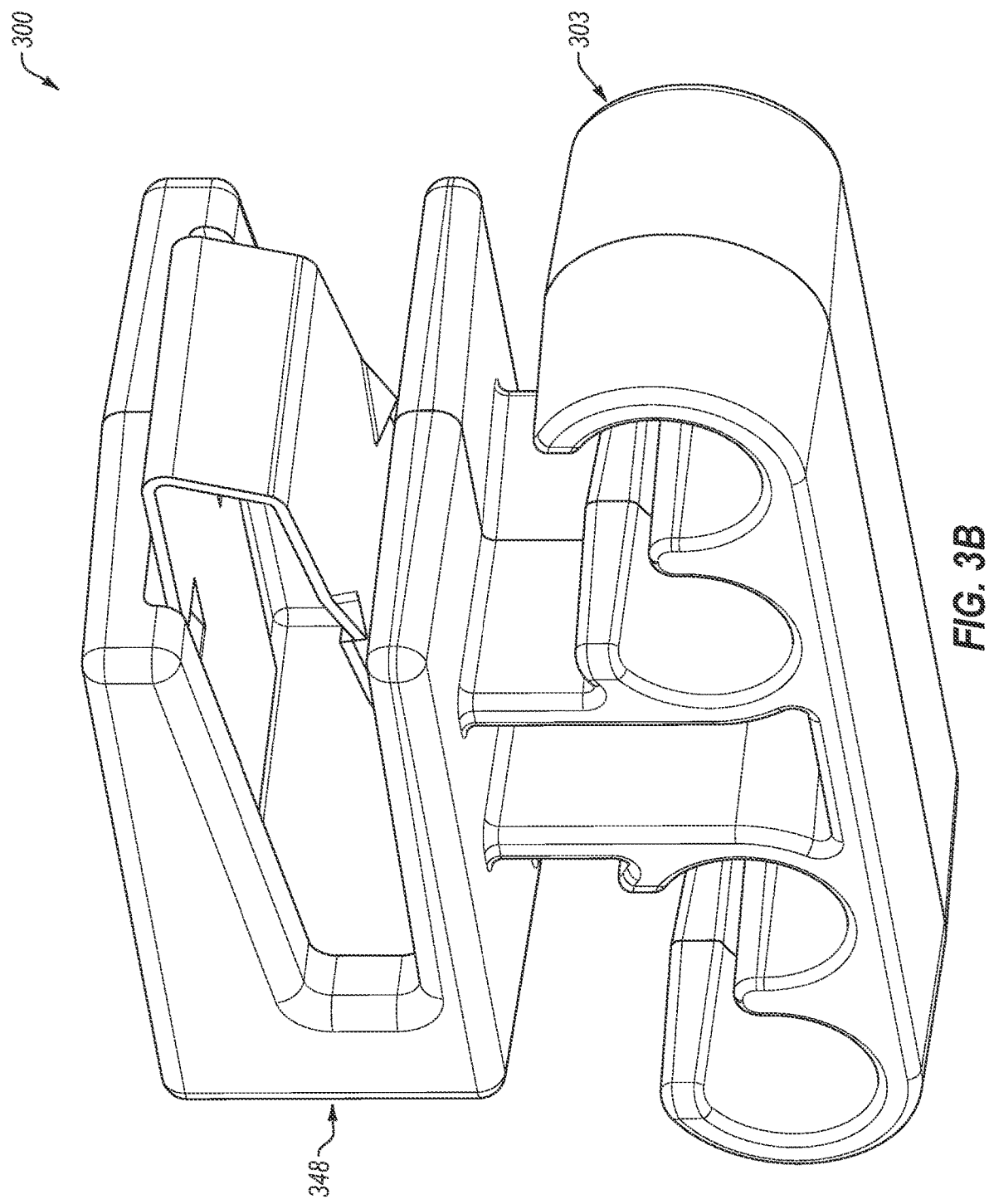
FIG. 3B is a back perspective view of the solar cable retention clip of FIG. 3A.
Figure 3C:
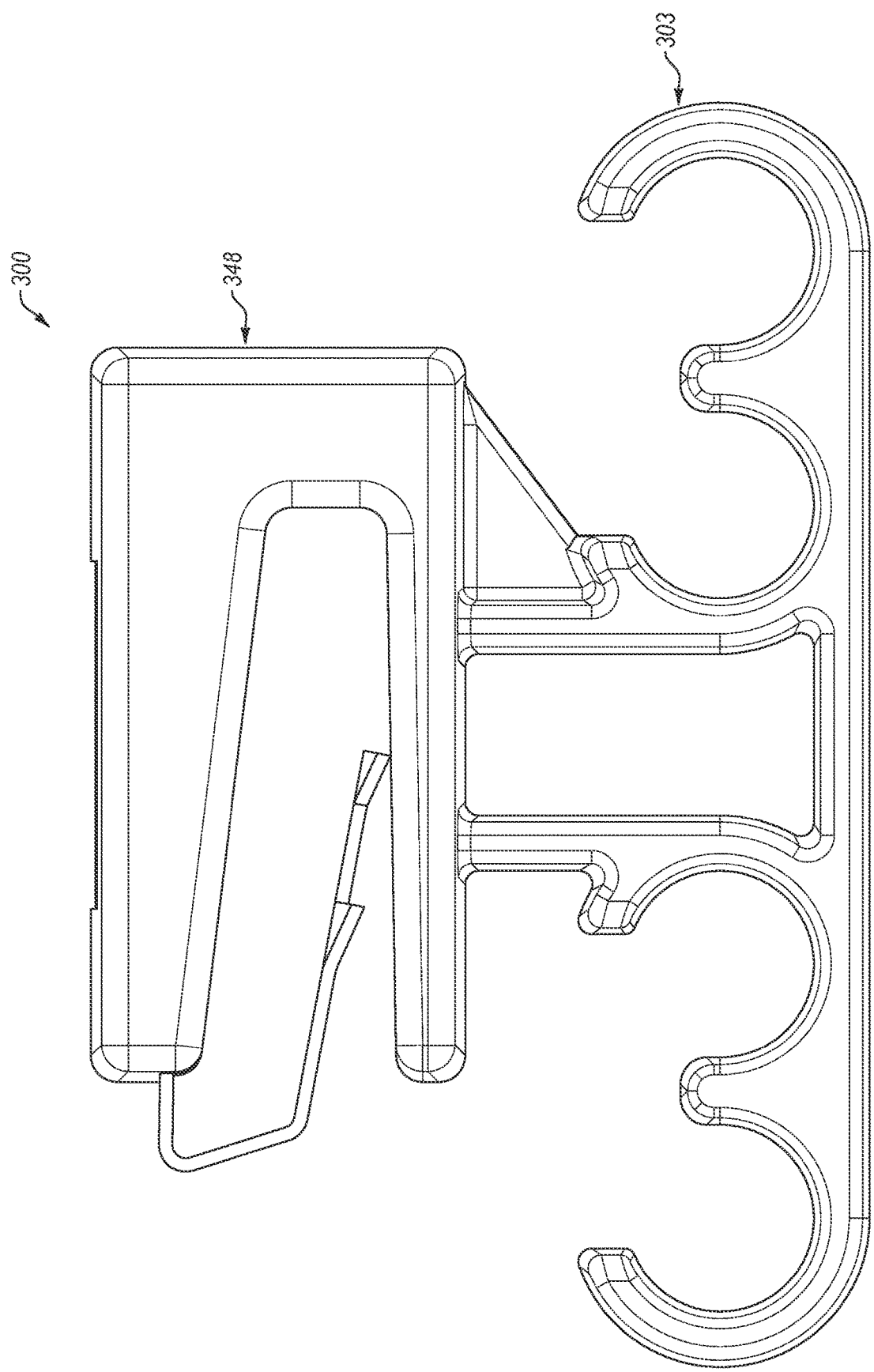
FIG. 3C is a front view of the solar cable retention clip of FIG. 3A.
Figure 3E:
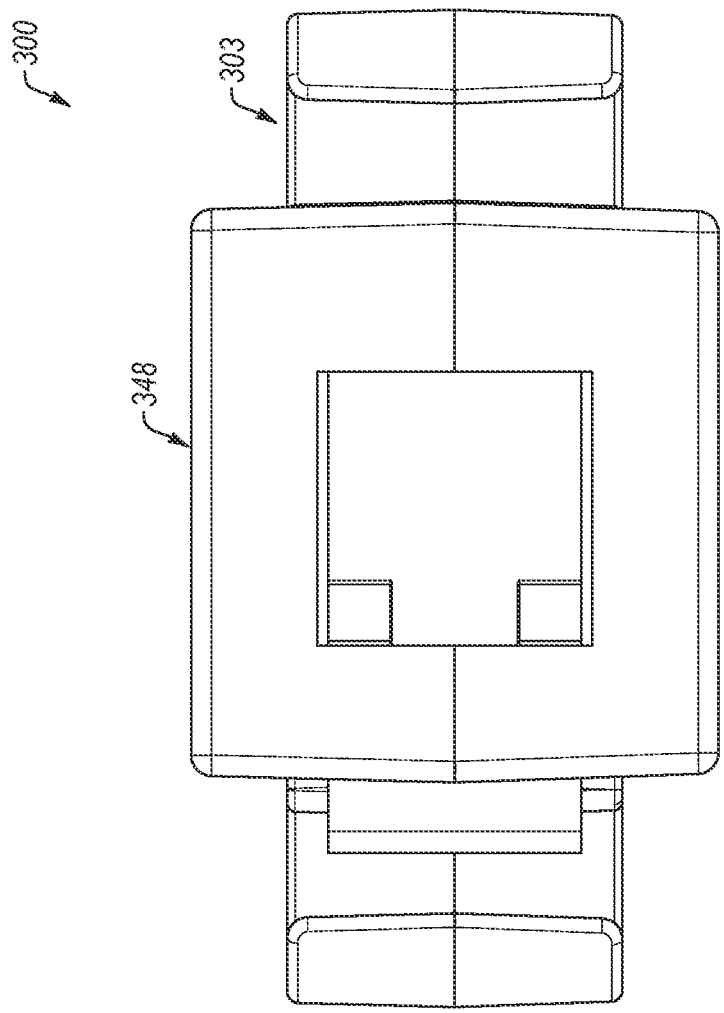
FIG. 3E is a top view of the solar cable retention clip of FIG. 3A.
Figure 3D:
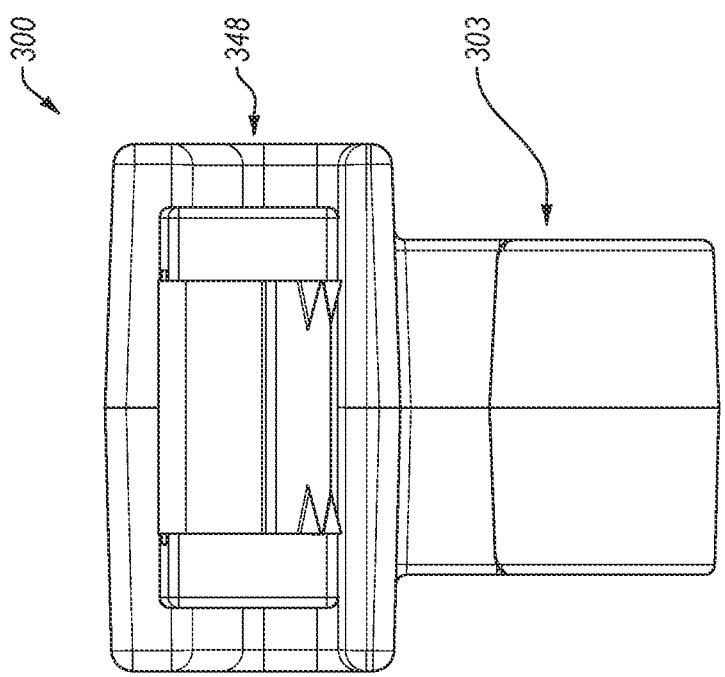
FIG. 3D is a side view of the solar cable retention clip of FIG. 3A.
Figure 4A:
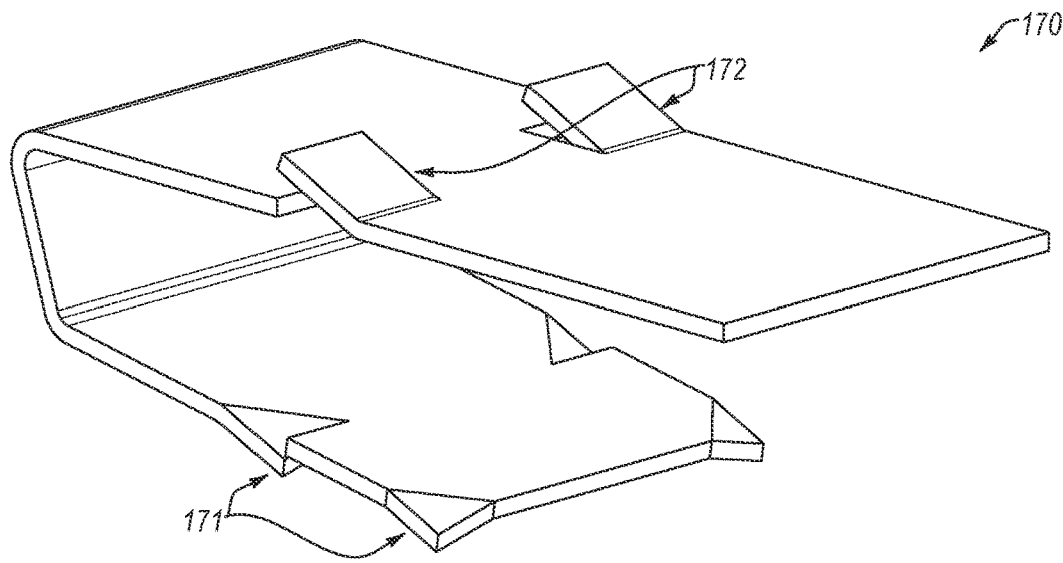
FIG. 4A illustrates a perspective view of the grip element that is in the solar cable retention clips of FIGS. 2A and 3A.
Figure 4B:
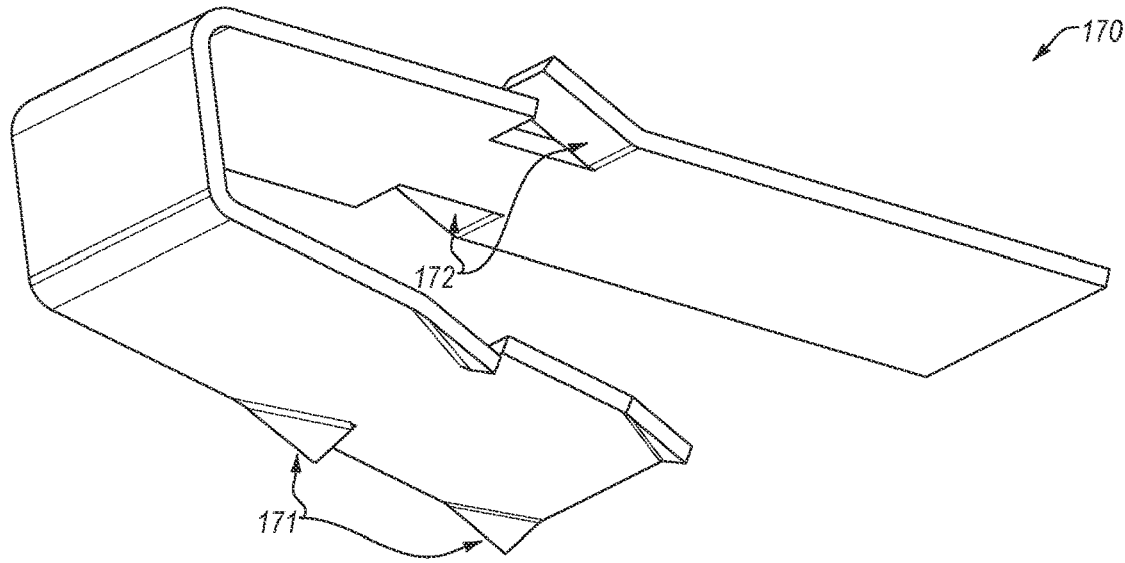
FIG. 4B illustrates a lower perspective view of the grip element of FIG. 4A.
Figure 4C:
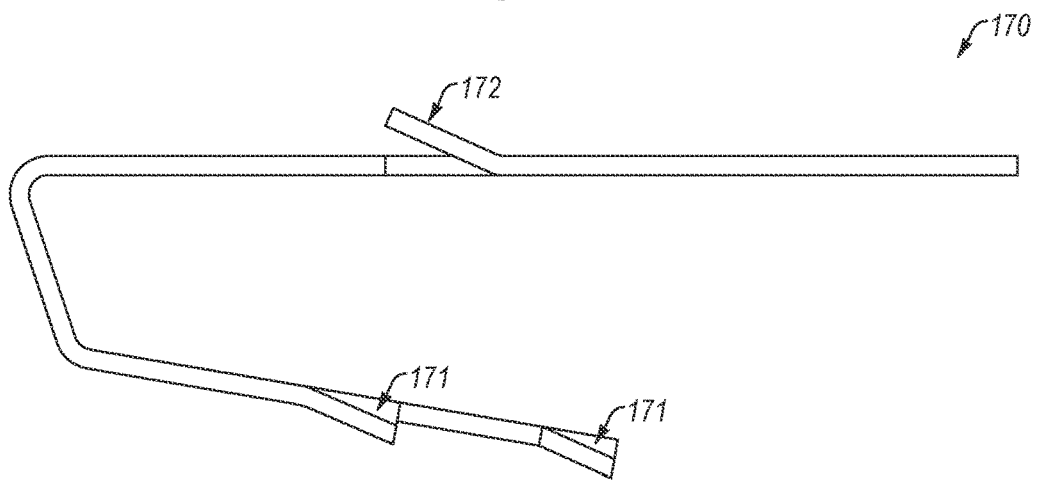
FIG. 4C illustrates a side view of the grip element of FIG. 4A.
Figure 4D:
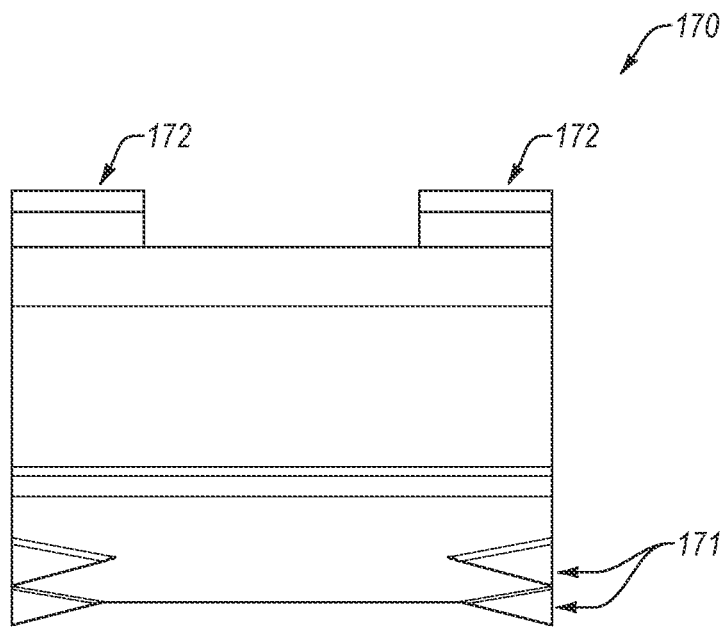
FIG. 4D illustrates a front view of the grip element of FIG. 4A.
Figure 4E:
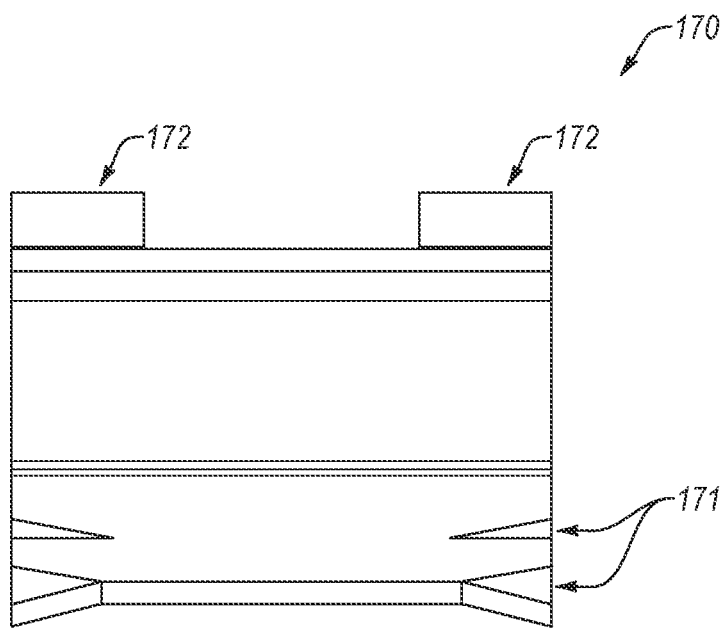
FIG. 4E illustrates a back view of the grip element of FIG. 4A.
Figure 4F:
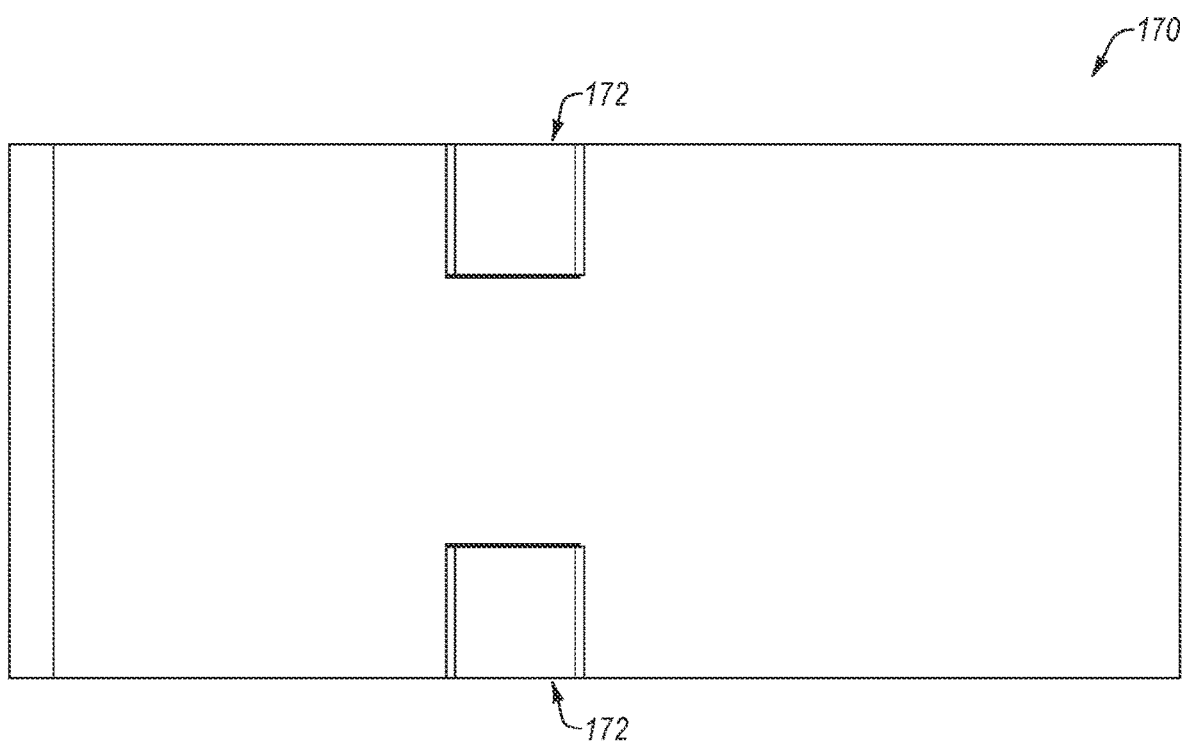
FIG. 4F illustrates a top view of the grip element of FIG. 4A.
Figure 4G:
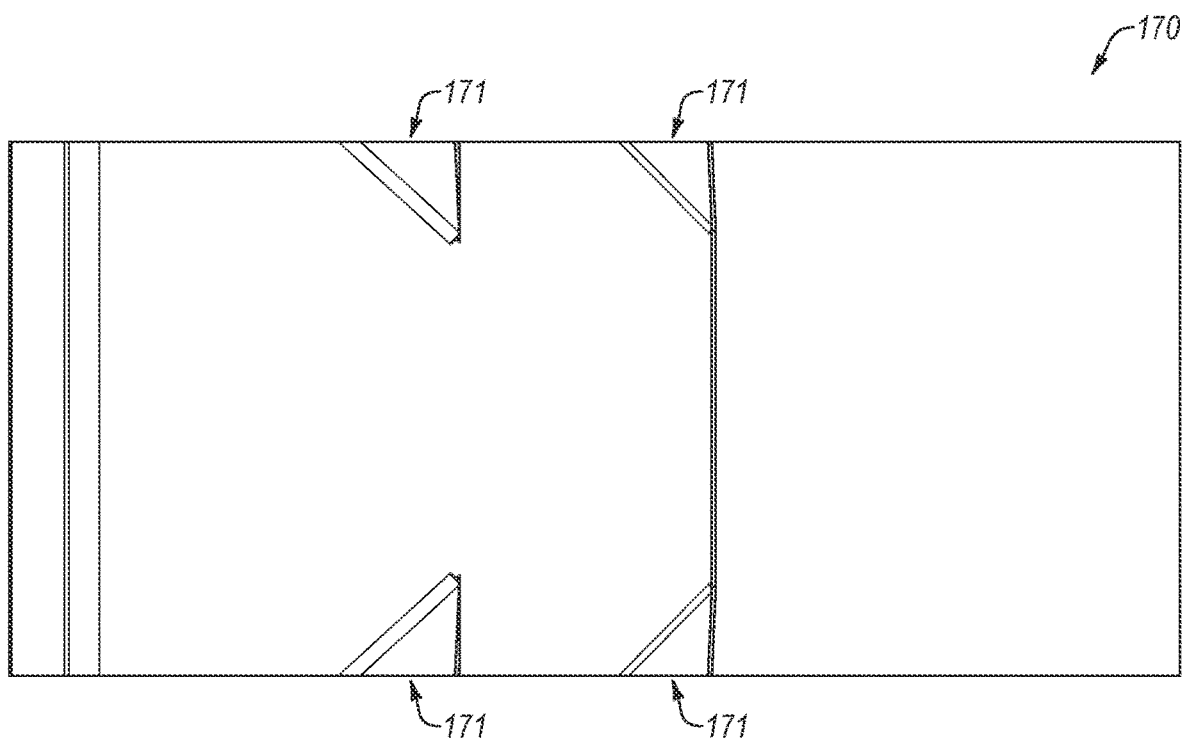
FIG. 4G illustrates a bottom view of the grip element of FIG. 4A.

FIG. 2C, which illustrates a back perspective of the retention clip 100, and 2D illustrates a front elevation view of the retention clip 100 from the front, illustrate additional details of the example embodiment. In addition, FIG. 2E shows a side elevation view of the retention clip 100, and FIG. 2F shows a top view of the retention clip.

The retention clip 100 can be formed as a single integral piece in some embodiments. Optionally, the retention clip 100 may be formed from one or more pieces that are then attached. In example embodiments, the retention clip 100 comprises a plastic material, and may exhibit resilient properties to enhance engagement with the cables and/or the bracket as discussed above. In some embodiments, the clip is non-conductive, which may be advantageous in the event of an electrical short in a cable, for example. In embodiments, the material(s) used are also resilient to severe environmental conditions (cold, heat, humidity), so as to be able to withstand varying weather conditions present in a typical solar installation.

While the embodiment of the retention clip 100 described above illustrates an implementation that provides support and alignment of a plurality of equally sized (gauges) of cable, it will be appreciated that embodiments could be provided that support more than four cables, and/or that provide support for cables of different sizes (gauges). Examples can include channels for 1, 2, 3, 4, 5, 6, 7, or 8 cables of equal or different sizes.

In some embodiments, the cable retention clip can include the a body being formed by two pairs of at least two connected C-shaped arms connected together at a first separating region (e.g., 119) of the first body that is positioned at least partially between the pair of cable retention channels. In some aspects, the body is formed by a plurality of connected C-shaped arms that are connected together at a second separating region of the body that is positioned at least partially between two pairs of the cable retention channels.

The plurality of cable retention channels can be positioned adjacent to each other. Each cable retention channel is formed by a curved arm extending from an adjacent curved arm. In some aspects, the plurality of cable retention channels are formed such that each curved arm forms a cable channel opening by a channel gap being between an end of the curved arm and an end of a second separating region being at least partially between adjacent cable retention channels. Also, a common gap is between at least one pair of curved arm ends that forms an inlet region for both of the cable retention channels in each pair of channels.

In some embodiments, the cable retention clip can various configurations. In some aspects, an adjacent pair of cable retention channels forms a ω shape. In some aspects, at least two pairs of cable retention channels form a ω shape. In some aspects, a center separating region is between the two sets of cable retention channels and forms a branch with each branch arm pointing in opposite directions. In some aspects, the openings of each ω shape of the first cable retention channels open up toward the structure retention portion or away from the structure retention section.

As is shown, the retention clip 100 is configured to be detachably attached to a component of a solar installation system by including a structure retention section 148 having a clamp housing. The clamp housing is configured to couple to a component by receiving a thin planar substrate of the component into the housing opening. For example, a thin planar substrate portion of a mounting bracket, H-pile, I-beam, cross-beam, rail, or other beam can slide into the housing opening. Additionally, the retention clip 100 is configured to be detachable attached to solar cables of the solar installation system by including a cable retention section 103 configured as a cable clip. The cable clip can include at least one cable retention channel 110a-d. For example, there can be one or more cable retention channels 110a-d that can couple with cables, where two cable retention channels are shown.

FIGS. 3A-3E show additional example details of the retention clip 300, which is similar to the retention claim 100 of FIGS. 2A-2F. It will be appreciated that in the example retention clip 300 as shown, the structure retention section is orthogonal to the retention clip 100. This provides a different relative orientation of the cable retention section 303 and the structure retention section 348, which is about 90 degrees different. However, the other details of retention clip 300 are similar to the retention clip 100 of FIGS. 2A-2F, and thereby incorporated by specific reference.

FIGS. 4A-4G illustrate a perspective view and side view of the grip element 170. In these views, additional details of the grip element 170 are visible. The grip element 170 may include teeth 171 and retention spurs 172. The teeth 171 may be in contact with the planar substrate of the component receiving the retention clip when the retention clip 100 is attached to the planar substrate of the component. The teeth 171 may serve to prevent the planar substrate from slipping out of the component retention channel 150. The retention spurs 172 may serve to hold the grip element 170 firmly in the component retention portion 148 by protruding into the aperture 176. The retention spurs 172 may serve to brace the grip element 170 so as to prevent the grip element 170 from moving relative to the structure retention section 148. The two retention spurs 172 protrude into the aperture in the top wall defining top surface 154, and thereby have a resistance force against the walls of the aperture in the top wall.

The retention spurs 172 may be formed in such a way so as to allow for removal of the grip element 170 from the structure retention section 148. For example, the retention spurs 172 may be formed so as to allow movement of the grip element 170 towards the bottom surface 156 of the structure retention channel 150 to allow for removal of the grip element 170. In some embodiments, the grip element 170 may be formed in such a way so as to apply force to the bottom surface 152 and the side surfaces 154, 156 of the structure retention channel 150 when the retention clip 100 is not attached to the planar substrate of the structure component in order to retain the grip element 170 in place.

Figure 5:
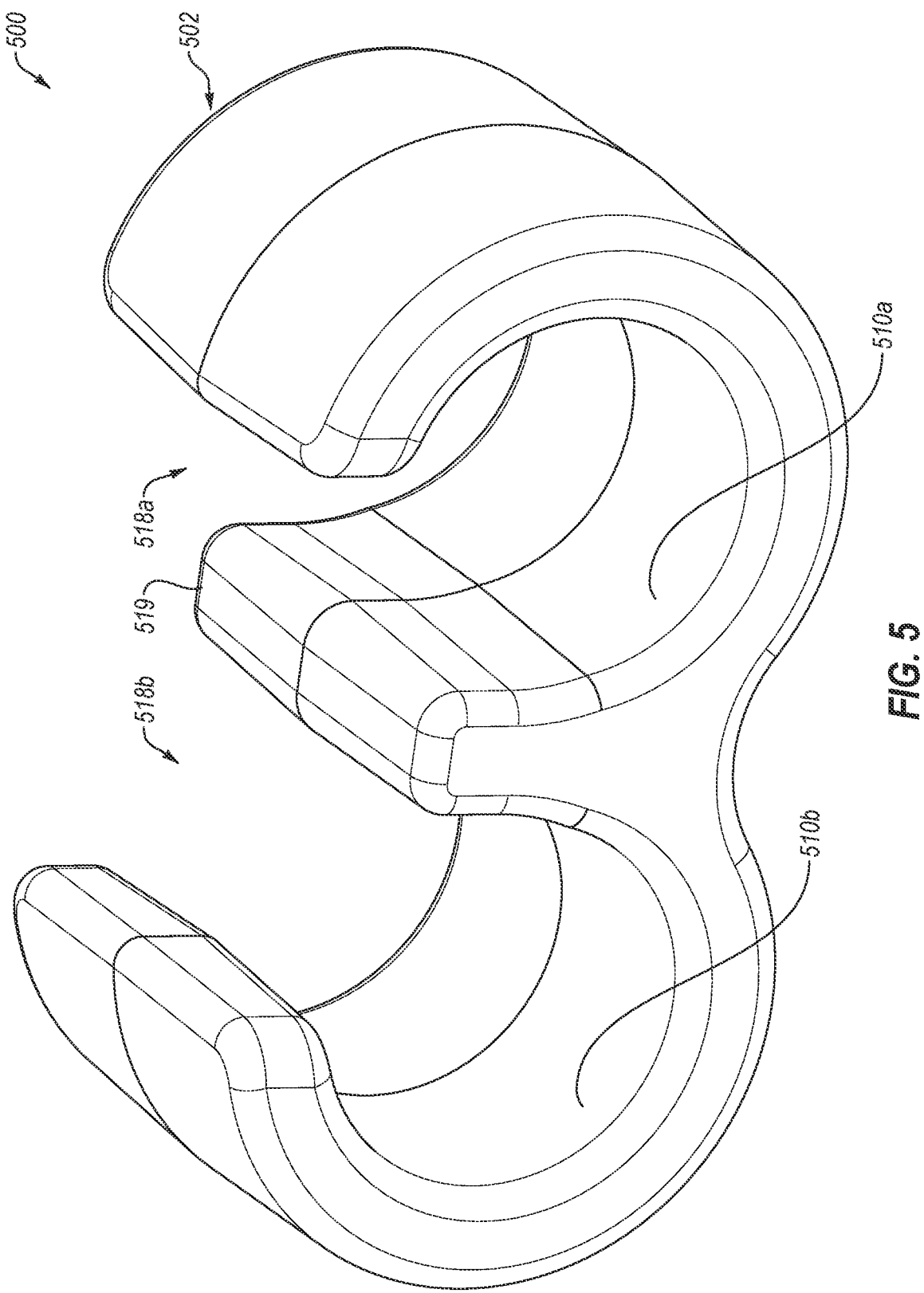
FIG. 5 illustrates an upper perspective view of an embodiment of a cable retention clip.

FIG. 5 illustrates one example of the cable clips 114 and 116 denoted in FIG. 1B, now referred to as cable clip 500.

As noted, the cable clips (one of which is shown in FIG. 5) may be used in the cable management system so as to maintain connection and grouping between selected groups (e.g., pairs or more) of cables, such as in FIGS. 1D and 1E. As with the retention clip 100, the example cable clip 500 includes a clip body portion, denoted at 502, defining one or more clip cable retention channels, two of which are shown in the example at 510a and 510b. Each channel 510a and 510b is separated by a cable separator portion 519. Each cable retention channel 510a,b includes a cable channel opening 518a,b that allows the cables to be pressed into the channels 510a,b, such as normal or orthogonal with a longitudinal axis of each channel 510a,b. In example embodiments, the cable clip 500 comprises a plastic material, and may exhibit resilient properties to enhance engagement with the cables as discussed above. In some embodiments, the cable clip is non-conductive, which may be advantageous in the event of an electrical short in a cable, for example. In embodiments, the material(s) used are also resistant to severe environmental conditions (cold, heat, humidity), so as to be able to withstand varying weather conditions present in a typical solar installation.

Figure 6:
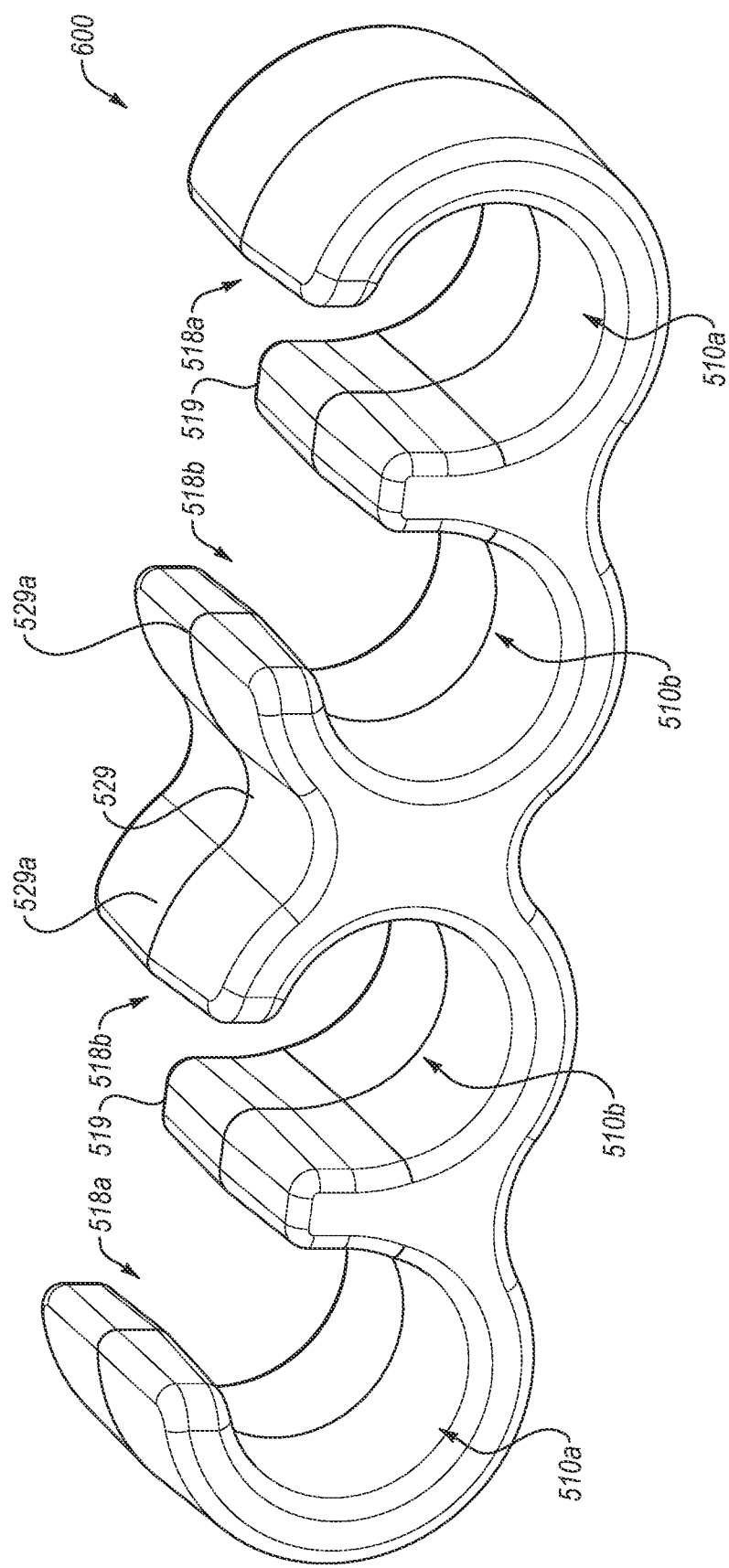
FIG. 6 illustrates an upper perspective view of another embodiment of a cable retention clip.
Figure 7:
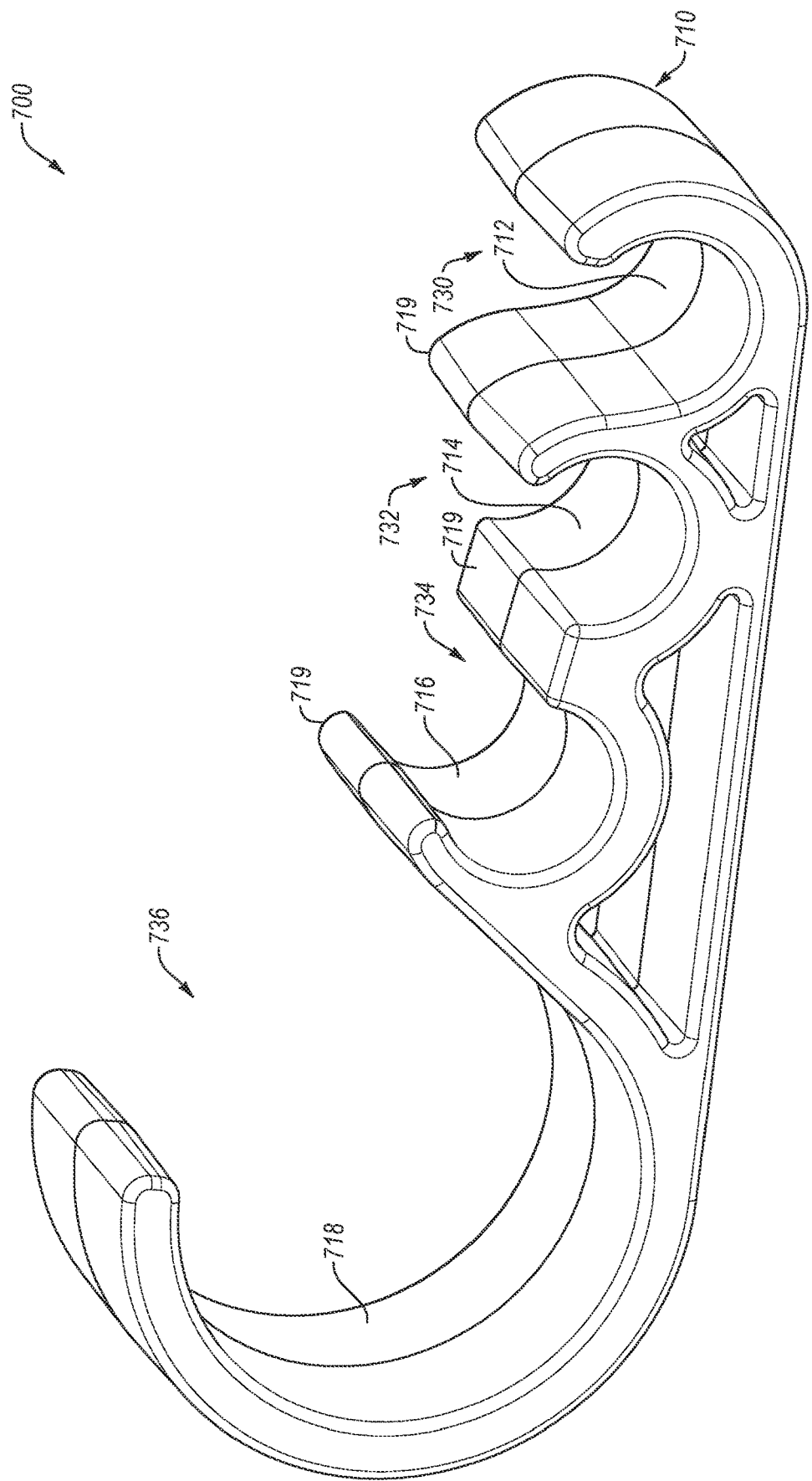
FIG. 7 illustrates an upper perspective view of another embodiment of a cable retention clip.

While the embodiment of the cable clip 500 described above illustrates an implementation that provides support and alignment of two equally sized (gauges) of cable, it will be appreciated that embodiments could be provided that support more than two cables, and/or that provide support for cables of different sizes (gauges). For example, FIGS. 6 and 7 illustrate additional examples of a cable clip, denoted at 600 and 700. The cable clips 600 and 700 are similar to the cable clip 500, except that additional clip cable retention channels are provided—here a total of four. It will be appreciated that any number of cable retention channels can be provided based on the needs of a given application.

Other details regarding the clip 600 are shown in FIG. 6, all of which are similar to those already described in connection with the clip 500 and will not be repeated here. Additionally, the cable clip 600 can include two pairs of channels, which are laterally arranged around a center separating member 529. The separating member 529 can include two wings 529a,b for the members of the pair of channels. The two wings 529a,b help form the shape of the inner channels 510b.

FIG. 7 illustrates another example of a cable clip denoted at 700, which is configured to couple with four cables, with at least one of the cables having a larger outer diameter (gauge), than the other cables. Of course, other combinations of sizes and cable numbers could be provided. As with the cable clips 500, 600 described previously, the cable clip 700 includes a clip body portion, denoted at 710, defining one or more clip cable retention channels, four of which are shown in the example at 712, 714, 716 and 718. Each channel 712, 714, 716 and 718 is separated by a cable separator portion, denoted here at 719. Each cable retention channel provides a cable receiving portion having a suitable shape—here a 'C' shape—so as to receive and retain in a detachable manner a corresponding cable. Each cable retention channel includes an adequate opening, denoted here at 730, 732, 734 and 736 to detachably receive and "clamp" or "clip" a corresponding cable. The size (e.g., the diameter) of a given cable retention channel will depend on the size of the outer circumference of a given cable (or gauge of the cable). Similarly, the dimensions of a given cable retention channel opening 730, 732, 734 and 736 is such so as to receive the cable in a manner to adequately retain it, and yet allow its removal if needed. The retention ability due to resiliency can be enhanced depending on the resilient material used for the cable clip 700, which can be configured similarly with cable retention clip 100 and cable clips 500 and 600.

Figure 8:
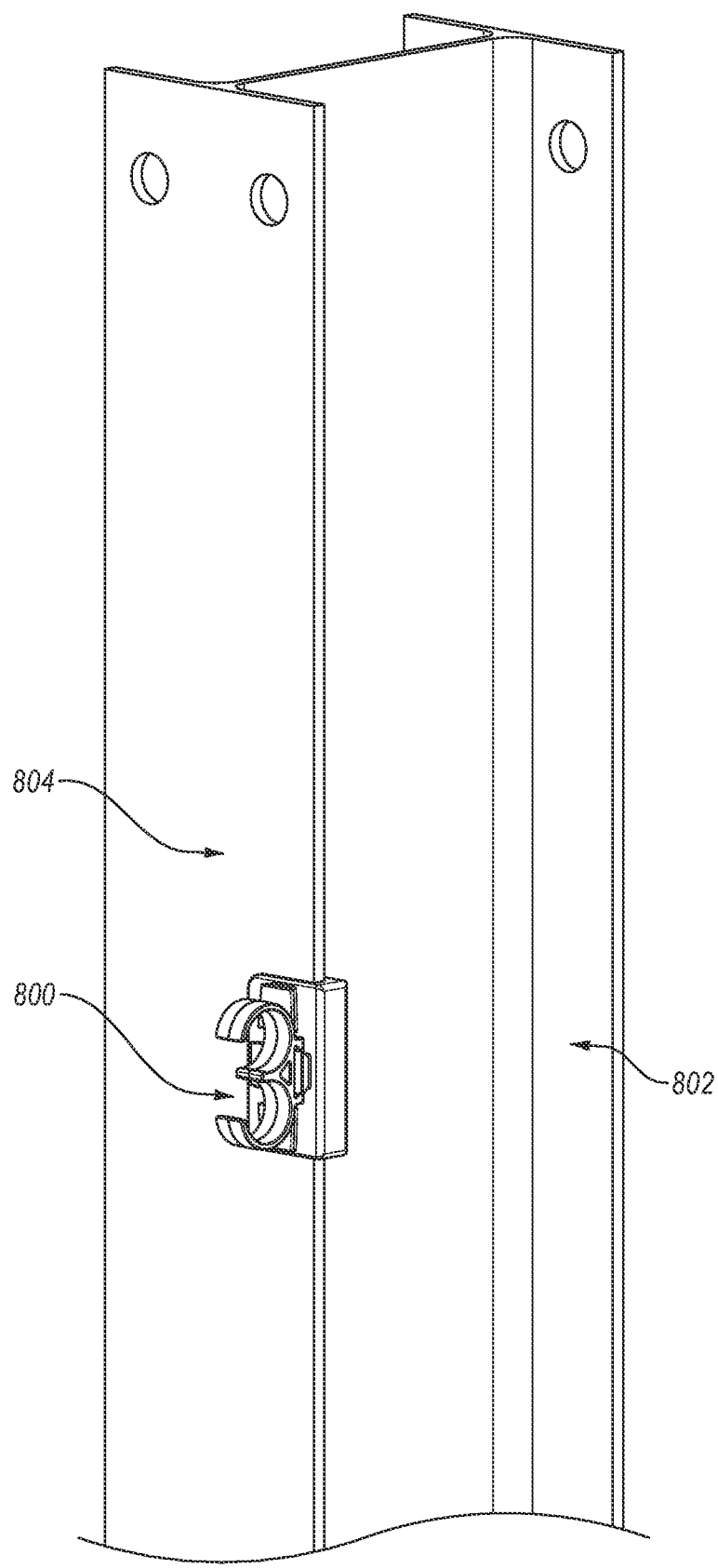
FIG. 8 illustrates a perspective view showing one example of a cable retention clip being used in a typical solar installation by being coupled to an H-pile.

FIG. 8 shows an example use of a cable retention clip 800 being mounted to an H-pile 802. As shown, the H-pile 802 includes a thin planar substrate 804, which is received into the structure retention channel of the cable retention clip 800. The cable retention clip 800 is shown with only two cable retention channels that are oriented away from the structure retention section. As such, the cable retention clip 800 can be configured as with the cable retention clips 100, 300. As such, a cable retention clip can include any number of cable retention channels, preferably in pairs or triplets, and the cable retention channels can be oriented toward the structure retention section or away from the structure retention section.

In another embodiments, a mounting bracket may be used to support a PV solar panel (not shown) via a clamp, rail, H-pile, I-beam, cross-beam, and/or other combinations of structural components as well as PV components. As is known, electrical power generated by a PV solar panel in the form of direct current (DC) generated by a solar panel is conducted to combiner boxes, inverters and the like (not shown) by way of one or more cables. Depending on the nature of the solar installation, there can be a large number of PV solar panels, resulting in a large number of cables. Thus, in a typical installation, many cables need to be oriented, routed and managed. The FIGS. 1B-1F illustrate the cable retention clips can be coupled to structural components, such as mounting brackets, H-piles, or others.

In some embodiments, a cable retention clip (100) can include a structure retention section (148) and a cable retention section (103). The structure retention section (148) can have a clamp body having a base wall (152) and two side walls (154, 156) forming a planar slot (150) therebetween. There can be at least one grip element (170) in the slot (150) that is coupled with at least one of the two side walls (154, 156). The cable retention section (103) can be coupled to the structure retention section (148). The cable retention section (103) can include a clip body defining at least two cable retention channels (110a,b). Each cable retention channel (110a,b) can have a cable opening (e.g., slot into lumen; 118a, 118b) that extends the length of the respective cable retention channel (110a,b) to form a C-shape. Each cable retention channel (110a,b) can be parallel with each other cable retention channel. In some aspects, the clip body defines at least a pair of the cable retention channels (110a,b) forming a ω shape. In some aspects, the cable retention channels (110a,b) consist of cable retention channels that have the same size. In some aspects, there are four cable retention channels (110a) that have the same size. In some aspects, the cable openings (118a,b) of the at least two cable retention channels (110a,b) are configured as slots that open towards the structure retention section (148). In some aspects, the cable openings (118a,b) of the at least two cable retention channels (110a,b) are configured as slots that open away from the structure retention section (148). In some aspects, the structure retention section (148) is a same resilient material as the cable retention section and integrated therewith.

The cable retention clip (100) can include the slot (150) being tapered from a wider slot opening (160) to a narrower slot base (152). This provides a friction fit or other tapered fit coupling with the support structure.

In some embodiments, the cable retention clip (100) can include a clip body that defines at least four cable retention channels (110a-d) with at least two pairs of the at least four cable retention channels being separated by a separator (121). The separator can have a first branch (123) that forms a first arm of a first pair of cable retention channels (110a,b) forming the ω shape and having a second branch (123) that forms a second arm of a second pair of cable retention channels (110a,b) forming the ω shape. The cable retention channels (110a,b) are arranged to have the parallel channel axes.

In some embodiments, a cable arrangement can include the cable retention clip (100) of one of the embodiments and at least two solar cables (106, 108). Each solar cable (106, 108) can be located in the respective cable retention channel (110a,b) of the cable retention clip.

In some embodiments, a cable clip (500) can be coupled to at least one solar cable (106, 108). The cable clip (500) can define at least two second cable retention channels (510a,b) that are arranged to have parallel channel axes. Each second cable retention channel (510a,b) has an inlet opening (518a,b) extending a length of the respective second cable retention channel so that each second cable retention channel forms a C-shape. Each second cable retention channel (510a,b) can be separated from an adjacent second cable retention channel by a second cable separator (519). The cable clip (500) has at least a pair of the second cable retention channels (518a,b) forming a ω-shape.

In some embodiments, a cable clip (600) is coupled to at least one solar cable (106, 108). The cable clip (600) can define at least two pairs of second cable retention channels (510a,b) that are separated by a branched cable separator (529). The branched cable separator can have a first branch (529a) that forms a first arm of a first pair of second cable retention channels forming the ω-shape and having a second branch (529b) that forms a second arm of a second pair of second cable retention channels forming the ω-shape. The at least four cable retention channels (510a,b) are arranged to have the parallel channel axes.

In some embodiments, a cable clip (700) is coupled to at least one solar cable (611, 624). The cable clip (700) can define at least four second cable retention channels (712, 714, 716, 718) with each second cable retention channel being separated by a second cable separator (719). Two second cable separators (719) have a pair of curved arms that form a first pair of second cable retention channels (714, 716) with one second cable separator (719) having a stubbed central protrusion thereby forming the ω-shape. The at least four second cable retention channels (712, 714, 716, 718) are arranged to have the parallel channel axes. At least one of the second cable retention channels (718) includes a larger size than at least three of the second cable retention channels (712, 714, 716) that have a same smaller size. The outer second cable retention channels (712, 718) form hook shapes that hook toward each other.

In some embodiments, a solar installation can include the cable arrangement of one of the embodiments and at least one solar panel operably coupled with at least one of the solar cables (106, 108).

In some embodiments, a kit can include the cable retention clip (100) of one of the embodiments and a cable clip (500, 600, 700) of one of the embodiments.

In some embodiments, a method of arranging solar cables can include: providing the cable retention clip (100) of an embodiment to a solar installation; sliding the planar slot (150) of the cable retention clip onto a planar structure (102) of the solar installation to couple the cable retention clip to the structure; and inserting at least two cables (106, 108) into at least two cable retention channels (110a,b) of the cable retention clip. It is noted, that either the planar slot (150) of the structure retention section or the cable retention channels (110a,b) can be mounted first, and either step can be performed in any order.

A method of hanging solar cables can be provided. Such a method can include using the retention clips described herein to couple lead cables and/or secondary cables to structural supports via a support clamp that is adapted to clamp onto a support member for solar cable hanging in above ground solar installations. The method can include clamping the support clamp of the cable retention clip onto a structural support. The method can include taking a wire cable and pressing it into a lead cable retention channel, such that the body flexes to receive the wire cable, and then retracts to form the channel around the wire cable. That is, a curved arm, such as a C shape, can be flexed laterally to open the channel to receive the cable, and then the curved arm retracts to its normal shape to retain the wire in the channel. The mounting to the structural support or pressing cables through the slots into the lumen can be performed in any order.

The flow of energy is harvested by the solar panels, which are passed to junction boxes, where wire harnesses can be used. The solar energy installation can also include recombiner boxes, inverters (DC to AC), transformers, and a switch yard. Each solar panel is connected to a junction box, which may be integrated or separate. Each junction box is in communication with one branch of a wire harness, typically with 6-12 branches, and 12 branches per wire harness being preferred. Each wire harness has one trunk, which is in communication with a recombiner box. The trunk can be an insulated high tensile strength BLA cable as described herein. For example, a harness can include a plurality of branches feeding into one trunk BLA. Preferably, the branches are constructed of 10 or 12 gauge photovoltaic wire, and trunk BLA wire cables are constructed of 10 or 8 gauge photovoltaic wires. One trunk can provide electricity in one direction and one trunk can provide electricity in the other direction.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors are known to those skilled in the art, may occur in amounts that do not preclude the effect the characteristic was intended to provide.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or materials, which can, of course, vary. It is also to be understood that the terminology used herein is for the purpose of describing particular embodiments only and is not intended to be limiting.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A cable retention clip comprising:
a structure retention section having a clamp body having a base wall and two side walls forming a planar slot therebetween;
at least one grip element in the slot and coupled with at least one of the two side walls, wherein the at least one grip element is resiliently deformable and, in an absence of any structure being retained within the planar slot, spans the planar slot between the two side walls along at least a portion of a length of the planar slot; and
a cable retention section coupled to the structure retention section, the cable retention section comprising a clip body defining at least two cable retention channels each having a cable opening that extends the length of the respective cable retention channel to form a C-shape, each cable retention channel being parallel with each other cable retention channel.

2. The cable retention clip of claim 1, wherein the clip body defines at least a pair of the cable retention channels forming a ω shape.

3. The cable retention clip of claim 1, wherein the at least two cable retention channels consist of cable retention channels that have the same size.

4. The cable retention clip of claim 1, wherein the slot is tapered from a wider slot opening to a narrower slot base.

5. The cable retention clip of claim 1, wherein the cable openings of the at least two cable retention channels are configured as slots that open towards the structure retention section.

6. The cable retention clip of claim 1, wherein the cable openings of the at least two cable retention channels are configured as slots that open away from the structure retention section.

7. The cable retention clip of claim 1, wherein structure retention section is a same material as the cable retention section and integrated therewith.

8. The cable retention clip of claim 1, wherein:
the clip body defines at least four cable retention channels with at least two pairs of the at least four cable retention channels being separated by a separator, the separator having a first branch that forms a first arm of a first pair of cable retention channels forming the ω shape and having a second branch that forms a second arm of a second pair of cable retention channels forming the ω shape, wherein the at least four cable retention channels are arranged to have the parallel channel axes.

9. A cable arrangement comprising:
the cable retention clip of claim 1; and
at least two solar cables, each solar cable being located in the respective cable retention channel of the cable retention clip.

10. The cable arrangement of claim 9, further comprising a cable clip coupled to at least one solar cable, the cable clip defining at least two second cable retention channels that are arranged to have parallel channel axes, each second cable retention channel has an inlet opening extending a length of the respective second cable retention channel so that each second cable retention channel forms a C-shape, each second cable retention channel being separated from an adjacent second cable retention channel by a second cable separator, wherein the cable clip has at least a pair of the second cable retention channels forming a ω-shape.

11. The cable arrangement of claim 9, further comprising a cable clip coupled to at least one solar cable, the cable clip defining at least two pairs of second cable retention channels being separated by a branched cable separator, the branched cable separator having a first branch that forms a first arm of a first pair of second cable retention channels forming the ω-shape and having a second branch that forms a second arm of a second pair of second cable retention channels forming the ω-shape, wherein the at least four cable retention channels are arranged to have the parallel channel axes.

12. The cable arrangement of claim 9, further comprising a cable clip coupled to at least one solar cable, the cable clip defining at least four second cable retention channels with each second cable retention channel being separated by a second cable separator, two second cable separators have a pair of curved arms and form a first pair of second cable retention channels with one second cable separator having a stubbed central protrusion thereby forming the ω-shape, wherein the at least four second cable retention channels are arranged to have the parallel channel axes, wherein at least one of the second cable retention channels includes a larger size than at least three of the second cable retention channels that have a same smaller size, wherein outer second cable retention channels form hook shapes that hook toward each other.

13. A solar installation comprising:
the cable arrangement of claim 9; and
at least one solar panel operably coupled with at least one of the solar cables.

14. The solar installation of claim 13, further comprising a cable clip coupled to at least one solar cable, the cable clip defining at least two second cable retention channels that are arranged to have parallel channel axes, each second cable retention channel has an inlet opening extending a length of the respective second cable retention channel so that each second cable retention channel forms a C-shape, each second cable retention channel being separated from an adjacent second cable retention channel by a second cable separator, wherein the cable clip has at least a pair of the second cable retention channels forming a ω-shape.

15. The solar installation of claim 13, further comprising a cable clip coupled to at least one solar cable, the cable clip defining at least two pairs of second cable retention channels being separated by a branched cable separator, the branched cable separator having a first branch that forms a first arm of a first pair of second cable retention channels forming the ω-shape and having a second branch that forms a second arm of a second pair of second cable retention channels forming the ω-shape, wherein the at least four cable retention channels are arranged to have the parallel channel axes.

16. The solar installation of claim 13, further comprising a cable clip coupled to at least one solar cable, the cable clip defining at least four second cable retention channels with each second cable retention channel being separated by a second cable separator, two second cable separators have a pair of curved arms and form a first pair of second cable retention channels with one second cable separator having a stubbed central protrusion thereby forming the ω-shape, wherein the at least four second cable retention channels are arranged to have the parallel channel axes, wherein at least one of the second cable retention channels includes a larger size than at least three of the second cable retention channels that have a same smaller size, wherein outer second cable retention channels form hook shapes that hook toward each other.

17. A kit comprising:
the cable retention clip of claim 1; and
a cable clip, the cable clip defining at least two second cable retention channels that are arranged to have parallel channel axes, each second cable retention channel has an inlet opening extending a length of the respective second cable retention channel so that each second cable retention channel forms a C-shape, each second cable retention channel being separated from an adjacent second cable retention channel by a second cable separator, wherein the cable clip has at least a pair of the second cable retention channels forming a ω-shape.

18. A kit comprising:
the cable retention clip of claim 1; and
a cable clip, the cable clip defining at least two pairs of second cable retention channels being separated by a branched cable separator, the branched cable separator having a first branch that forms a first arm of a first pair of second cable retention channels forming the ω-shape and having a second branch that forms a second arm of a second pair of second cable retention channels forming the ω-shape, wherein the at least four cable retention channels are arranged to have the parallel channel axes.

19. A kit comprising:
the cable retention clip of claim 1; and
a cable clip, the cable clip defining at least four second cable retention channels with each second cable retention channel being separated by a second cable separator, two second cable separators have a pair of curved arms and form a first pair of second cable retention channels with one second cable separator having a stubbed central protrusion thereby forming the ω-shape, wherein the at least four second cable retention channels are arranged to have the parallel channel axes, wherein at least one of the second cable retention channels includes a larger size than at least three of the second cable retention channels that have a same smaller size, wherein outer second cable retention channels form hook shapes that hook toward each other.

20. A method of arranging solar cables, comprising:
providing the cable retention clip of claim 1 to a solar installation;
sliding the planar slot onto a planar structure of the solar installation to couple the cable retention clip to the structure; and
inserting at least two cables into at least two cable retention channels of the cable retention clip.

21. The cable retention clip of claim 1, wherein the at least one grip element includes a plurality of teeth that extend from a portion of the at least one grip element towards the base wall of the clamp body.

22. The cable retention clip of claim 1, wherein the at least one grip element includes a plurality of retention spurs that extend from a portion of the at least one grip element away from the base wall of the clamp body.

23. The cable retention clip of claim 1, wherein the at least one clip element comprises:
a first portion configured to engage a first side wall of the two side walls;
a second portion that extends from the first portion at an acute angle; and
a third portion that extends from the second portion at an obtuse angle, the third portion configured to extend to a second side wall of the two side walls in an absence of any structure being retained within the planar slot.

24. The cable retention clip of claim 23, wherein the at least one clip element further comprises at least one of:
retention spurs that extend from the first portion in a direction away from both the base wall and the second side wall into an aperture or recess of the first side wall, the retention spurs configured to inhibit the at least one grip element from moving relative to the structure retention section; or
teeth that extend from the third portion in a direction towards both the base wall and the second side wall and configured to inhibit movement of the cable retention clip relative to a structure retained within the planar slot in a direction opposite the direction in which the teeth extend.

25. A cable retention clip comprising:
a structure retention section having a clamp body having a base wall and two side walls forming a planar slot therebetween;
at least one grip element in the slot and coupled with at least one of the two side walls, wherein the at least one grip element comprises a resilient clamp that extends outside the planar slot; and
a cable retention section coupled to the structure retention section, the cable retention section comprising a clip body defining at least two cable retention channels each having a cable opening that extends the length of the respective cable retention channel to form a C-shape, each cable retention channel being parallel with each other cable retention channel.

26. A cable retention clip comprising:
a structure retention section having a clamp body having a base wall and two side walls forming a planar slot therebetween;
at least one grip element in the slot and coupled with at least one of the two side walls, wherein the at least one grip element comprises:
a first portion that engages a first side wall of the two side walls;
a second portion that extends from the first portion at an acute angle;
a third portion that extends from the second portion at an obtuse angle and at least partially towards a second side wall of the two side walls;
a plurality of retention spurs that extend from the first portion at least partially away from the base wall; and
a plurality of teeth that extend from the third portion at least partially toward the base wall; and
a cable retention section coupled to the structure retention section, the cable retention section comprising a clip body defining at least two cable retention channels each having a cable opening that extends the length of the respective cable retention channel to form a C-shape, each cable retention channel being parallel with each other cable retention channel.

* * * * *